United States Patent
Obayashi et al.

[11] Patent Number: 6,143,480
[45] Date of Patent: Nov. 7, 2000

[54] LEUCO DYE AND IMAGE RECORDING MEDIUM CONTAINING THE SAME

[75] Inventors: Tatsuhiko Obayashi; Atsuhiro Ohkawa, both of Kanagawa, Japan

[73] Assignee: Fuji Photo Film Co., Ltd., Kanagawa, Japan

[21] Appl. No.: 09/388,390

[22] Filed: Sep. 1, 1999

[30] Foreign Application Priority Data

Sep. 3, 1998 [JP] Japan ................. 10-250081

[51] Int. Cl.$^7$ ................. G03C 1/40
[52] U.S. Cl. ................. 430/332; 430/336; 430/270.1
[58] Field of Search ................. 430/270.1, 332, 430/336

[56] References Cited

U.S. PATENT DOCUMENTS 5,071,987  12/1991  Raulf et al. ............... 546/168
5,243,052   9/1993  Taylor et al. ............. 546/154

FOREIGN PATENT DOCUMENTS 0 909 656 A2  4/1991  European Pat. Off. .

*Primary Examiner*—Janet Baxter
*Assistant Examiner*—Amanda C. Walke
*Attorney, Agent, or Firm*—Sughrue, Mion, Zinn, Macpeak & Seas, PLLC

[57] ABSTRACT

Disclosed is a leuco dye in which a hydrogen atom capable of transferring by isomerization in a dye represented by formula (1) or a tautomer thereof is substituted by a substituent group P which can be removed by the action of heat or acid

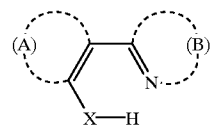

(1)

wherein (A) represents an atomic group necessary for forming a nitrogen-containing hetero ring; (B) represents an atomic group necessary for forming a six-membered hetero ring; and X represents an oxygen atom, a sulfur atom or a nitrogen atom, which may have a hydrogen atom or a possible substituent group.

8 Claims, 7 Drawing Sheets

LEUCO DYE AND IMAGE RECORDING MEDIUM CONTAINING THE SAME

FIELD OF THE INVENTION

This invention relates to a novel leuco dye which forms color by the action of heat or acid, to an image recording medium which contains said dye and to a chemical amplification type high sensitivity image recording medium which is further combined with a compound which generates acid by the action of light or heat.

BACKGROUND OF THE INVENTION

Thermosensitive recording materials express image parts and non-image parts as differences in temperature distribution, and various systems have been devised such as melt transfer or sublimation transfer of coloring agents, coloring reaction between two components by heat melting or capsule disruption and alteration of optical characteristics by phase transition. Since such types of thermal recording media can produce record images by a simple dry system and also have an advantage of being maintenance-free, they are broadly used as output materials such as of various printers, word processors and facsimiles. In addition, with the progress in the development of laser recording apparatuses, their application to optical disks and plate making materials has been examined in recent years.

Though silver halide light-sensitive materials which require wet treatments have been generally used as the plate making materials, several techniques have been proposed in recent years regarding the thermosensitive recording system because of the increasing demand for the development of a dry process in order to simplify the treating steps and resolve the environmental pollution problem caused by the treated liquids. Among these techniques, a laser-aided image recording system is desirable from the viewpoint of resolution; for example, a high output laser-aided system which is called dye ablation has been developed, and its recording materials have been disclosed for example in JP-A-7-164755 (the term "JP-A" as used herein means an "unexamined published Japanese patent application"), JP-A-7-149063 and JP-A-7-149065, and its image forming apparatuses for example in JP-A-8-48053 and JP-A-8-72400.

In this system, image recording is carried out by a method in which a recording material having a dye composition comprising an image dye coated on a base, a substance having absorption in the laser wavelength region (infrared absorbing substance) and a binder is irradiated with laser from the dye layer side. The energy generated by the laser causes a rapid local change in the image forming layer at a spot where the material is exposed to the laser beam and thereby puts out the substance from the layer. According to the aforementioned references, this is not a completely physical change (e.g., melting, evaporation or sublimation) but a certain chemical change (e.g., bond breakage) and is not partial elimination of the image dye but its complete elimination. Such a dye ablation system has problems in that high output laser is essential for the improvement of dye-elimination efficiency at the region exposed to laser and it is necessary to employ a dust catcher in juxtaposition with the system in order to collect the eliminated dye.

As a system which does not require a dust catcher, a description about an ablation transfer type image recording method which uses laser as a heat source is disclosed in U.S. Pat. No. 5,171,650. This system uses a dye donor sheet containing a dynamic separation layer on which an ablative carrier topcoat is finished, and the image is transferred to an adjacent acceptor sheet aligned with the donor sheet. Thus, it has a problem in that the discarded sheet after image recording becomes a waste material. Also in this case, high output laser is essential for improving transfer efficiency. Accordingly, the related art thermosensitive recording systems in which laser ablation is used have problems in that high output laser is essential and discharge of dust and waste materials is unavoidable.

On the other hand, a system in which a so-called "Dry Silver" system is further developed is described in JP-A-6-194781 as a thermosensitive recording system which does not accompany laser ablation. In this system, recording is carried out with laser on a recording material which contains a thermally reducible silver source, a silver ion reducing agent and a light-heat conversion dye, but its practical performance is not sufficient in terms of the shell life of non-image parts and heat sensitivity.

Also, regarding other laser-aided thermosensitive recording systems, compounds whose absorption changes by thermal decomposition of carbamate are described in U.S. Pat. No. 4,602,263 and U.S. Pat. No. 4,826,976, and a compound which develops yellow color by thermal decomposition of t-butoxycarbonyl group introduced into hydroxyl group is described in U.S. Pat. No. 5,243,052. Since these systems use irreversible monomolecular reactions, they are suited for extremely short-time laser-aided image recording, but their sensitivity is not sufficient so that further improvement of the sensitivity is expected.

In addition, no practical idea has been proposed on a laser-aided heat mode system as a method for the formation of UV mask image (360 nm to 420 nm; corresponding to the exposure light source on PS plate) to be subjected to plate making material use.

SUMMARY OF THE INVENTION

A first object of the present invention is to provide a novel leuco dye showing a high sensitive and irreversible color formation by the action of heat or acid.

A second object of the present invention is to provide a novel image recording medium which has high sensitivity, can effect image recording with such a low degree of output laser that ablation does not occur even in the case of the use of a laser-aided heat mode image recording system (image recording corresponding to 360 to 420 nm, particularly essential as mask films for plate making use) and does not require separate image receiving sheet.

The objects of the present invention has been accomplished by the following items 1) to 8).

1) A leuco dye in which a hydrogen atom capable of transferring by isomerization in a dye represented by formula (1) or a tautomer thereof is substituted by a substituent group P which can be removed by the action of heat or acid

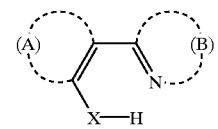

(1)

wherein in formula (1), (A) represents an atomic group necessary for forming a nitrogen-containing hetero ring; (B) represents an atomic group necessary for forming a six-membered hetero ring; and X represents an oxygen atom, a sulfur atom or a nitrogen atom, which may have a hydrogen atom or a possible substituent group.

2) The leuco dye according to item 1), which is represented by formula (2)

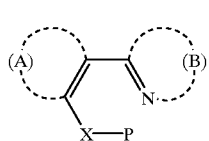

(2)

wherein (A), (B) and X in formula (2) are as defined in formula (1), and P represents a substituent group which can be removed by the action of heat or acid.

3) The leuco dye according to item 2), which is represented by formula (3)

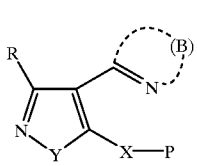

(3)

wherein in formula (3), R represents a hydrogen atom or a substitutable group, Y represents an oxygen atom, a sulfur atom or a nitrogen atom, which may have a hydrogen atom or a possible substituent group; and (B), X and P are as defined in the formula (2), with the proviso that, when X and Y are both nitrogen atoms, substituent groups on the nitrogen atoms may form a ring through their mutual bonding.

4) The leuco dye according to items 1) to 3), wherein X in the formulas (1) to (3) is an oxygen atom.

5) The leuco dye according to items 1) to 4), wherein the leuco dye represented by the formulas (1) to (3) has a polymerizable group at a substitutable position and forms a copolymer with a monomer having a partial structure which generates acid by the action of light, heat or acid.

6) An image recording medium which comprises the leuco dye according to items 1) to 5).

7) The image recording medium according item 6), which further comprises a compound which generates acid by the action of light or heat.

8) The image recording medium according to item 6) or 7), which further comprises an infrared absorbing substance.

Other objects and advantages of the present invention will be made apparent as the description progresses.

DETAILED DESCRIPTION OF THE INVENTION

Figure 1:
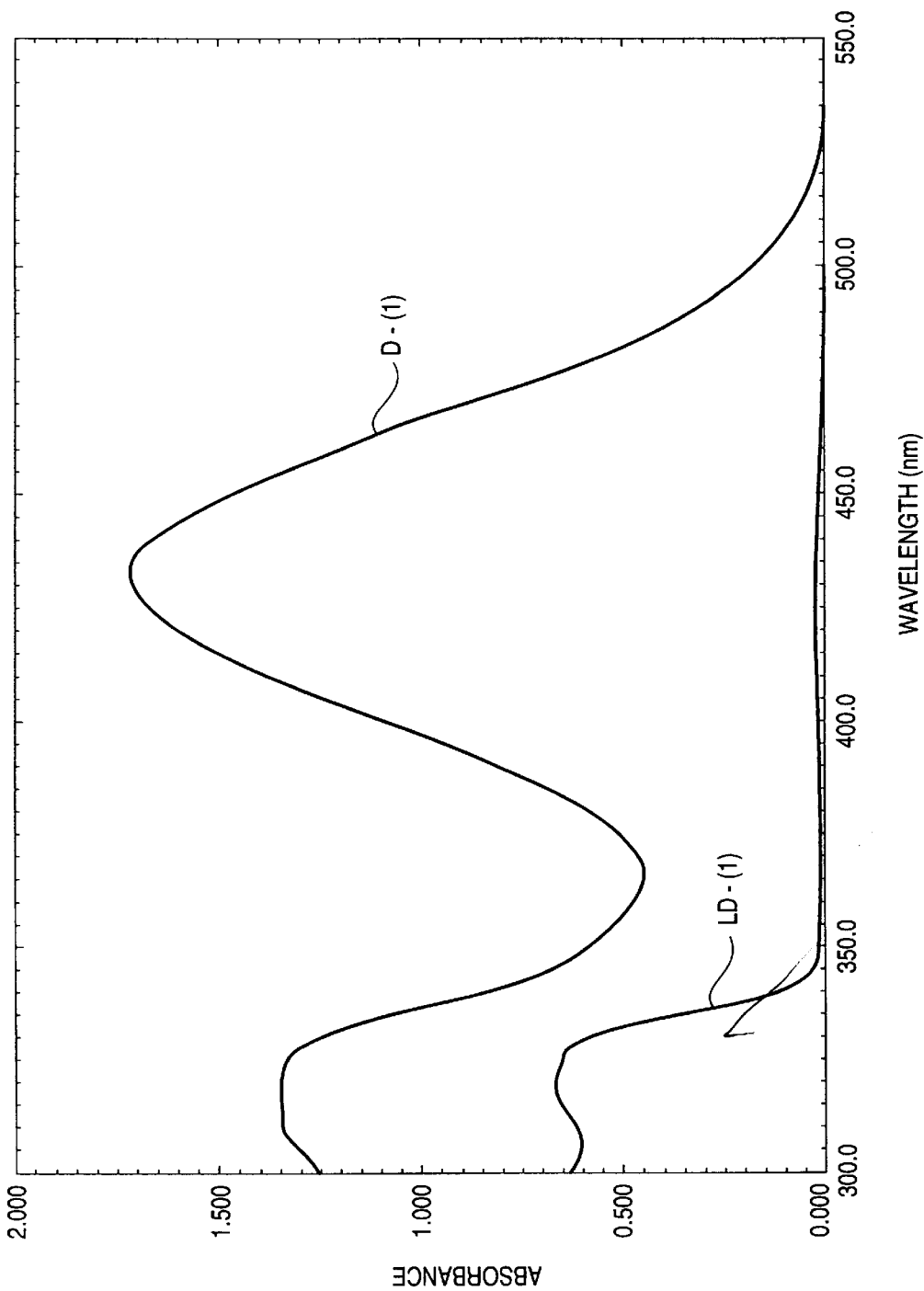
FIG. 1 is a graph showing absorption chart of the color former of leuco dye LD-(1) (in ethyl acetate).

In the formula (1), (A) is an atomic group which is necessary for the formation of a nitrogen-containing hetero ring together with C=C. Preferred is a case in which a five- or six-membered nitrogen-containing hetero ring is formed, and particularly preferred is a case in which a five-membered nitrogen-containing hetero ring is formed. In addition, these hetero rings may have possible substituent groups which may form a condensed ring through their mutual bonding. Preferred examples of the five-membered nitrogen-containing hetero ring include pyrazole ring, oxazole ring, imidazole ring, thiazole ring, triazole ring, pyrazolotriazole ring and pyrazoloimidazole ring, and preferred examples of the six-membered nitrogen-containing hetero ring include pyridine ring and pyrimidine ring.

(B) is an atomic group which is necessary for the formation of a six-membered nitrogen-containing hetero ring together with C=N. These hetero rings may have possible substituent groups which may form a condensed ring through their mutual bonding. Its preferred examples include pyridine ring, pyrimidine ring, quinoline ring, quinazoline ring and quinoxaline ring.

X is oxygen atom, a sulfur atom or nitrogen atom (which may have hydrogen atom or a possible substituent group), preferably oxygen atom. When X is nitrogen atom, the substituent group may form a condensed ring through its bonding to the atomic group represented by (A). When a condensed ring is formed by the bonding of the hetero ring containing (A) to the substituent group of X, pyrazolotriazole ring and pyrazoloimidazole ring can be cited as its preferred examples.

The leuco dye of the present invention is a colorless or light-colored compound obtained by substituting a hydrogen atom capable of transferring by isomerization in the dye represented by formula (1) or its tautomer, with the substituent group P.

P is a substituent group which is removed by the action of heat or acid. Preferred examples of the substituent group which is removed by the action of heat, for hydroxyl group, include an alkoxycarbonyl group (such as t-butoxycarbonyl, isopropyloxycarbonyl group, 1-phenylethoxycarbonyl, 1,1-diphenylethoxycarbonyl or 2-cyclohexeneoxycarbonyl group), a silyl group (such as trimethylsilyl, triethylsilyl, t-butyldimethylsilyl, t-butyldiphenylsilyl or phenyldimethylsilyl group), an alkoxymethyl group (such as methoxymethyl, ethoxymethyl, 1-methoxyethyl, 1-phenoxyethyl or 1-methyl-1-methoxyethyl group) and a secondary or tertiary alkyl group having hydrogen atom at the β-position (such as tetrahydropyranyl, tetrahydrofuranyl, 4,5-dihydro-2-rethylfuran-5-yl, t-butyl or 2-cyclohexenyl group).

Preferred examples of the substituent group which is removed by the action of heat, for sulfur atom, include an alkoxymethyl group (such as isobutoxymethyl or tetrahydropyranyl group), an alkoxycarbonyl group (such as benzyloxycarbonyl or p-methoxybenzyloxycarbonyl group), an acyl group (such as acetyl or benzoyl group), a benzyl group (such as p-methoxybenzyl, bis(4-methoxyphenyl)rethyl or triphenylmethyl group).

Preferred examples of the substituent group in a case in which amino group is formed by its removal by the action of heat or acid include an alkoxycarbonyl group (such as t-butoxycarbonyl, cyclohexyloxycarbonyl, 1,1-dimethylpropyloxycarbonyl, 1-methyl-1-phenylethoxycarbonyl or 2-chloroethoxycarbonyl group), an acyl group(such as acetyl, benzoyl, 2-nitrobenzoyl, 4-chlorobenzoyl or 1-naphthoyl group) and formyl group, of which alkoxycarbonyl groups are particularly useful in the present invention in view of storage stability and heat sensitivity.

Examples of the positions capable of being substituted by P in formula (1) or its tautomer include on the X atom, on the nitrogen atom adjacent to the connection position with the ring including (A) in the ring including (B), on the carbon atom at the connection position with the ring including (B) in the ring including (A), and on the hetero atoms in case where the ring including (A) or the ring including (B) has the other nitrogen atom or carbonyl group, etc. and a hydrogen atom can be connected on these hetero atoms. Of these, the case where P is substituted on the X atom as shown in the structure of formula (2) is preferred in view of absorption characteristics, activity, storage stability and synthesis aptitude.

The leuco dye of the present invention may form a polymer through the connection of a plurality of polymerizable groups introduced into polymerizable positions. When a polymer is formed, coating ability is obtained without using a binder so that it is advantageous in thinning the image recording layer. The polymer may have a weight average molecular weight within the range of preferably from 1,000 to 1,000,000, more preferably from 2,000 to 300,000. In this case, it may be a homopolymer or a copolymer with other monomer.

According to the present invention, improved sensitivity in terms of the generation of acid in the very vicinity of the leuco dye can be expected particularly when a copolymer is formed with a monomer which, as will be described later, has a partial structure that generates acid by the action of light, heat or acid. In that case, the copolymerization (molar) ratio of leuco dye/acid generating region is within the range of preferably from 100/1 to 1/20, more preferably from 20/1 to 1/5.

Also, in order to obtain the absorption characteristics of interest, a monomer having the leuco dye structure of the present invention may form a copolymer with another monomer having a structure of other leuco dye (described for example in JP-A-4-124175, JP-A-5-278342, JP-A-6-227139, JP-A-5-281654, JP-A-5-294977, JP-A-6-255256, U.S. Pat. No. 4,602,263 or U.S. Pat. No. 4,826,976) as its partial structure.

Among members of the leuco dye of the present invention represented by the formula (2), particularly useful from the viewpoint of synthesis aptitude are compounds having the structure of formula (3).

In the formula (3), R is hydrogen atom or a substitutable group.

Examples of the substituent group include an alkyl group (includes a group having a substituent group, such as methyl, ethyl, t-butyl, trifluoromethyl, chloromethyl or dimethylaminomethyl group), an aryl group (includes a group having a substituent group, such as phenyl, naphthyl, 4-dimethylaminophenyl, 2-methoxyphenyl, 4-nitrophenyl or 3-sulfophenyl group), an alkenyl group (includes a group having a substituent group, such as vinyl, 2-chlorovinyl, 2-dimethylaminovinyl, 2-phenylvinyl, 1-methylvinyl or allyl group), an alkynyl group (includes a group having a substituent group, such as ethynyl or 1-propynyl group), an aralkyl group (includes a group having a substituent group, such as benzyl group), a heterocyclic residue (includes a group having a substituent group, such as 2-pyridyl, 1-imidazolyl, benzothiazol-2-yl, morpholino, benzoxazol-2-yl or 6-hexadecylsulfonylaminobenzothiazol-2-yl group), a halogen atom (such as fluorine, chlorine, bromine or iodine), —NR$^1$R$^2$ {R$^1$ and R$^2$ are hydrogen atom, an alkyl group (its examples are as described for R), an aryl group (its examples are as described for R), an alkenyl group (its examples are as described for R), an alkynyl group (its examples are as described for R), an aralkyl group (its examples are as described for R) or a heterocyclic residue (its examples are as described for R), and R$^1$ and R$^2$ may be the same or different from each other or may form a heterocyclic ring through their mutual bonding}, —OR$^3$ (those which are described for R$^1$ and R$^2$ can be cited as the examples of R$^3$) and —SR$^4$ (those which are described for R$^1$ and R$^2$ can be cited as the examples of R$^4$).

In the formula (3), Y is NR$^5$ (those which are described for R$^1$ and R$^2$ can be cited as the examples of R$^5$), O or S. (B), X and P are as described in relation to the formula (1). When Y is NR$^5$ and X is nitrogen atom, substituent groups of R$^5$ and N may form a condensed ring through their mutual bonding. Examples of the case of the condensed ring formation include pyrazolotriazole ring and pyrazoloimidazole ring as described in the foregoing.

Though not particularly limited, illustrative examples of the leuco dyes of the present invention represented by the formulae (1) to (3) are shown in the following.

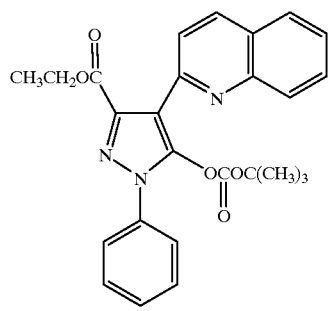

LD-(1)

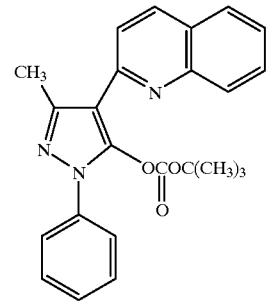

LD-(2)

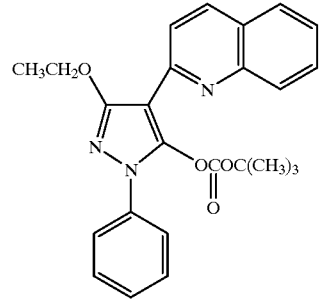

LD-(3)

LD-(4)
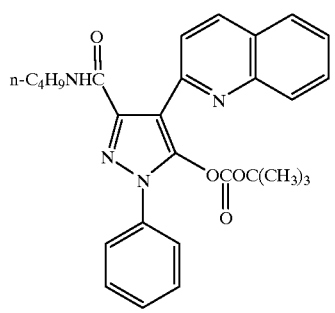
LD-(5)
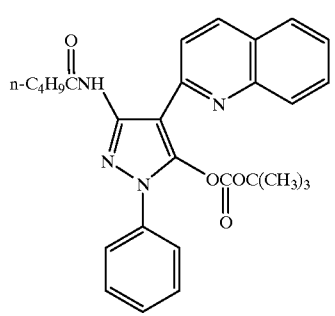
LD-(6)
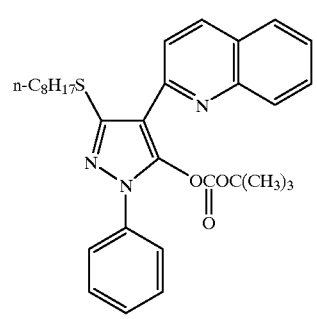
LD-(7)
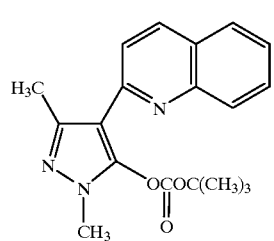
LD-(8)
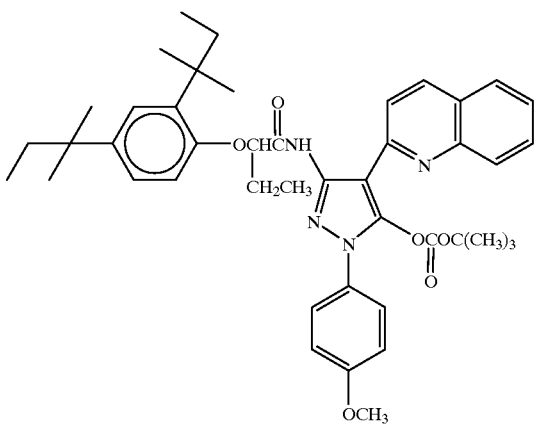
LD-(9)
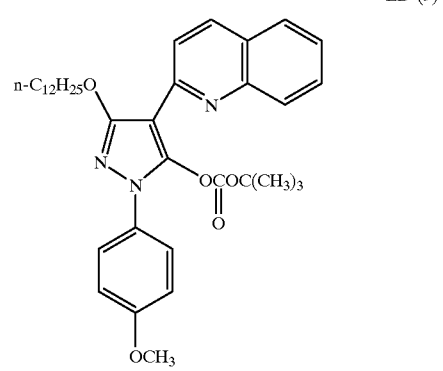
LD-(10)
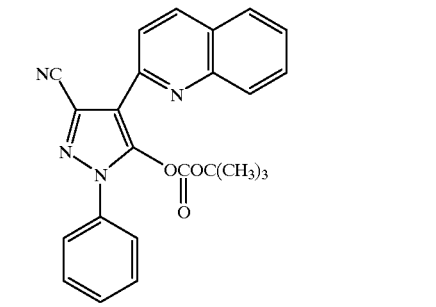
LD-(11)
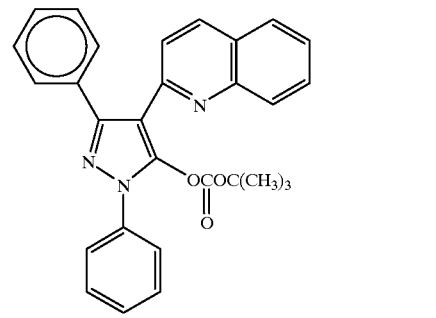

LD-(12)
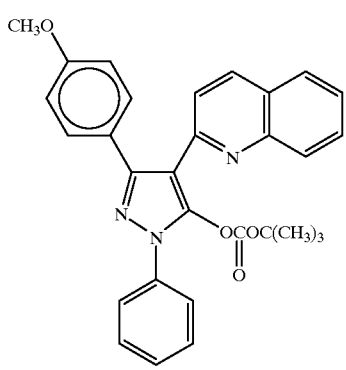
LD-(13)
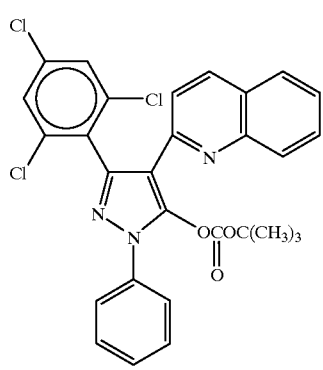
LD-(14)
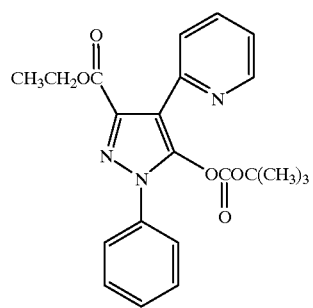
LD-(15)
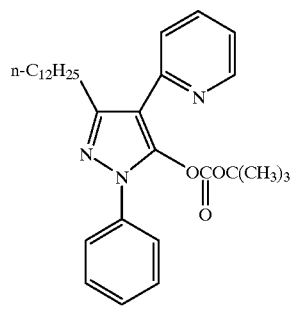
LD-(16)
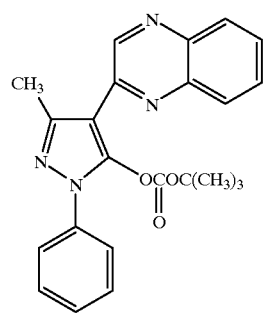
LD-(17)
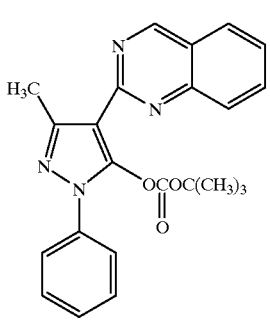
LD-(18)
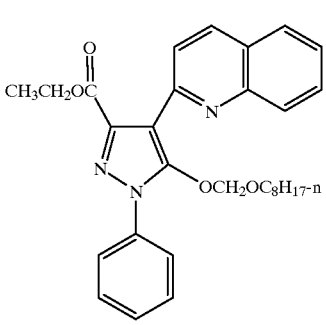
LD-(19)
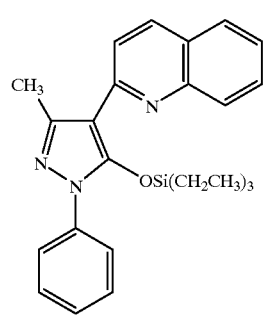
LD-(20)
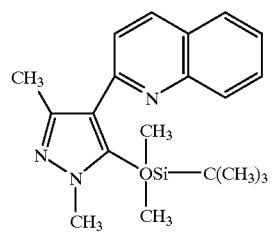

LD-(21)
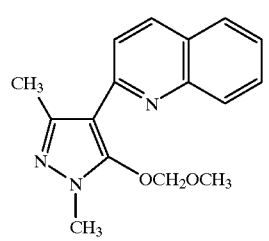
LD-(22)
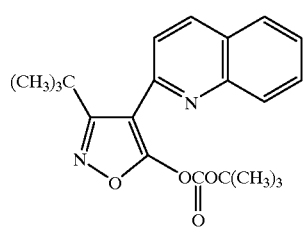
LD-(23)
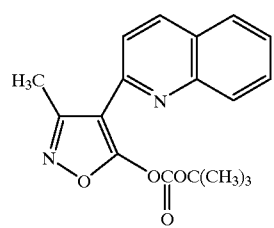
LD-(24)
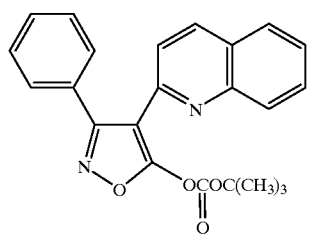
LD-(25)
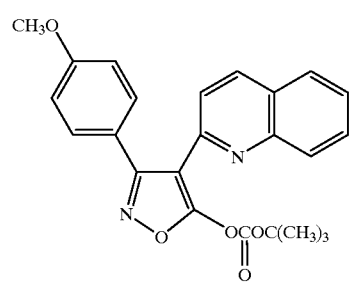
LD-(26)
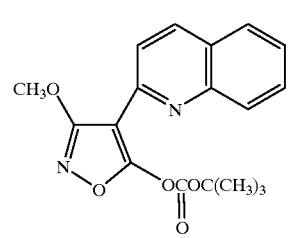
LD-(27)
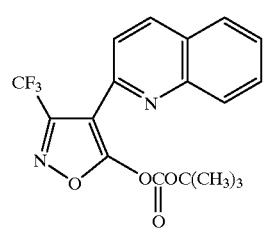
LD-(28)
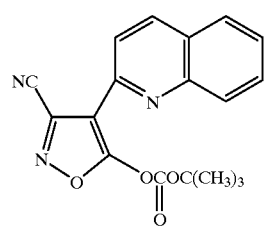
LD-(29)
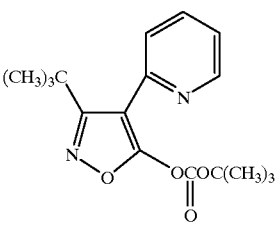
LD-(30)
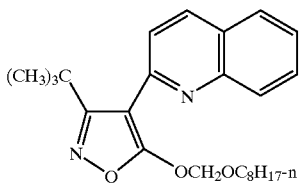
LD-(31)
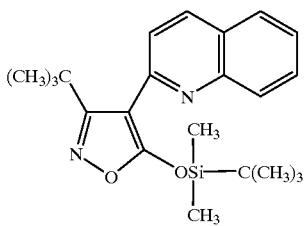
LD-(32)
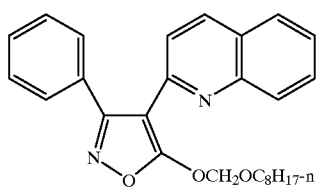

-continued
LD-(33)
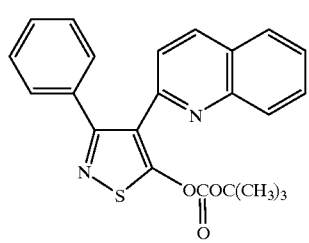
LD-(34)
LD-(35)
LD-(36)
LD-(37)
-continued
LD-(38)
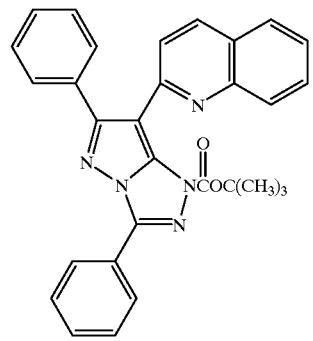
LD-(39)
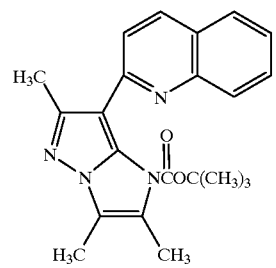
LD-(40)
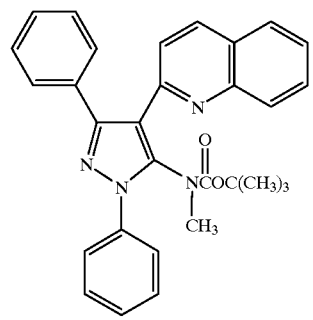
LD-(41)
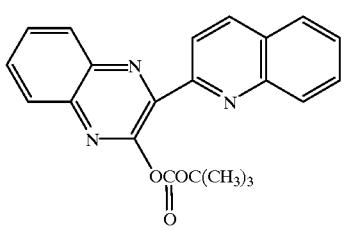
LD-(42)
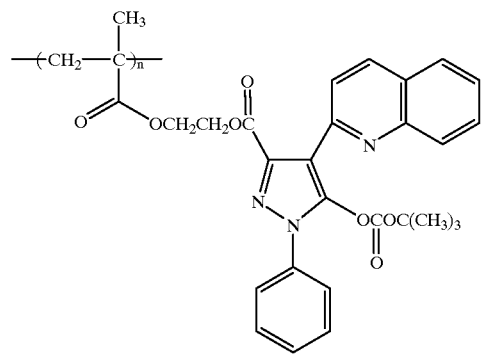

-continued

LD-(43), LD-(44), LD-(45), LD-(46), LD-(47), LD-(48), LD-(49), LD-(50), LD-(51)

-continued
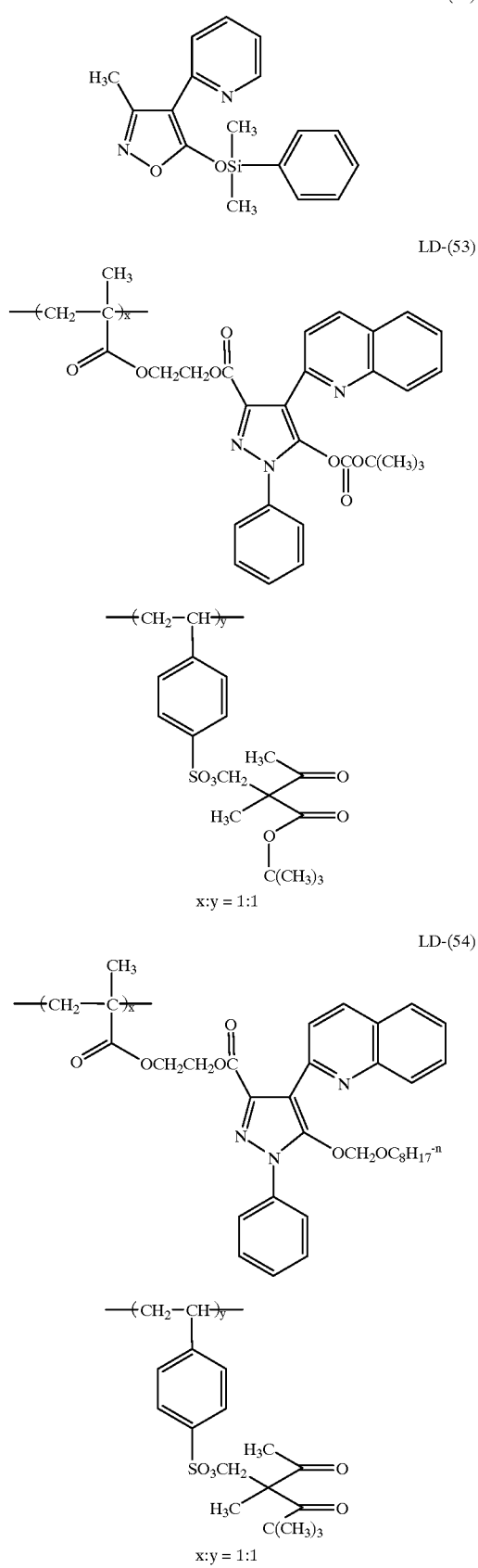
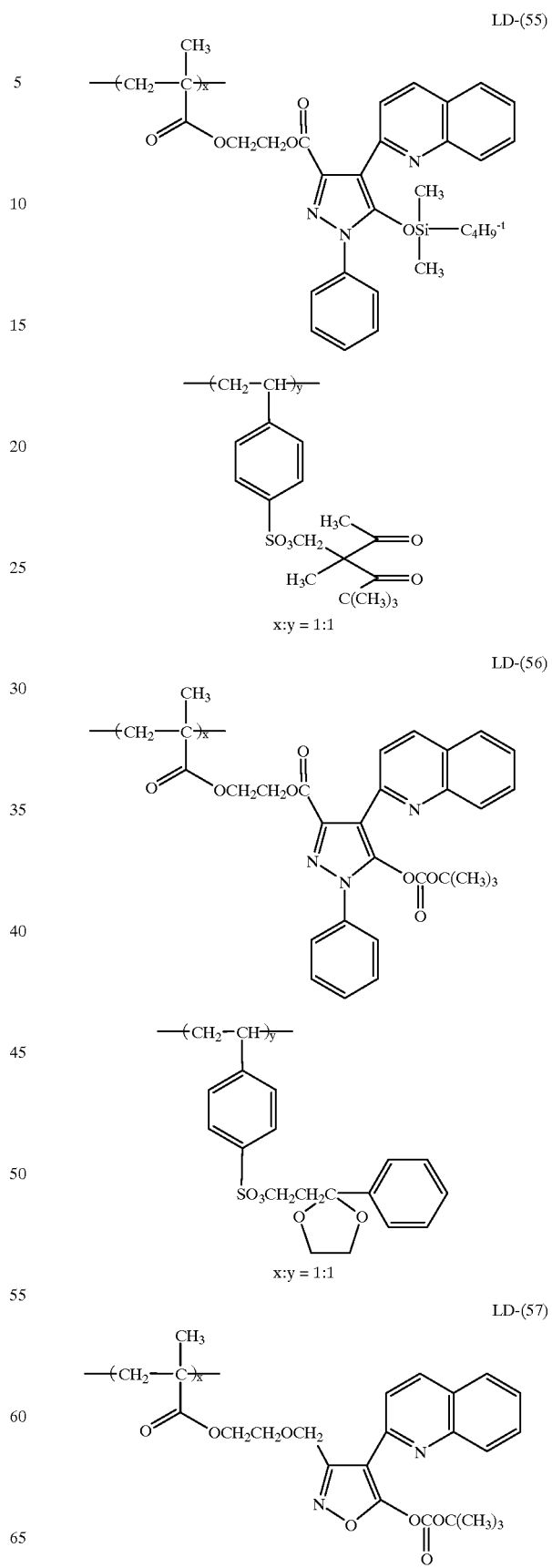

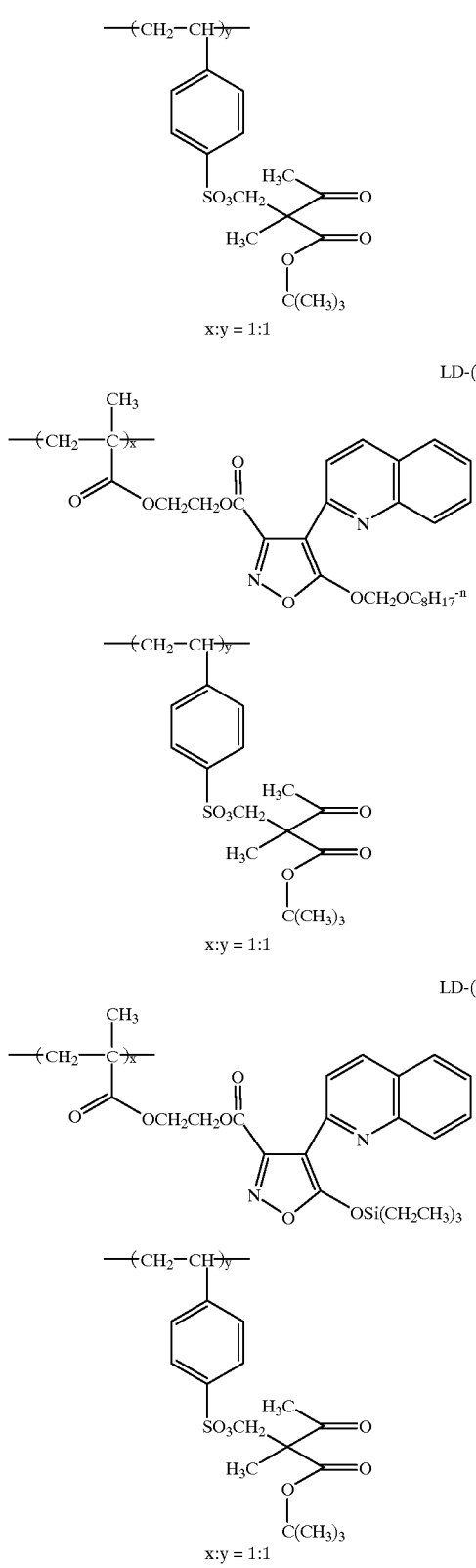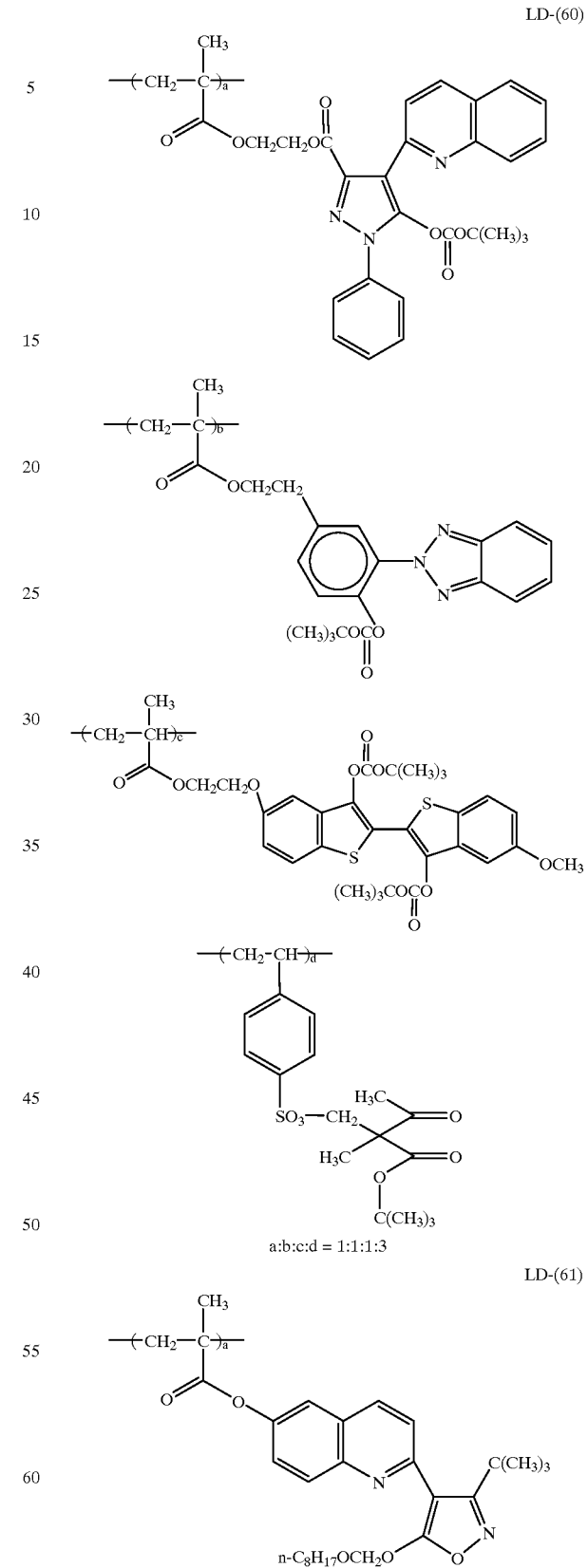

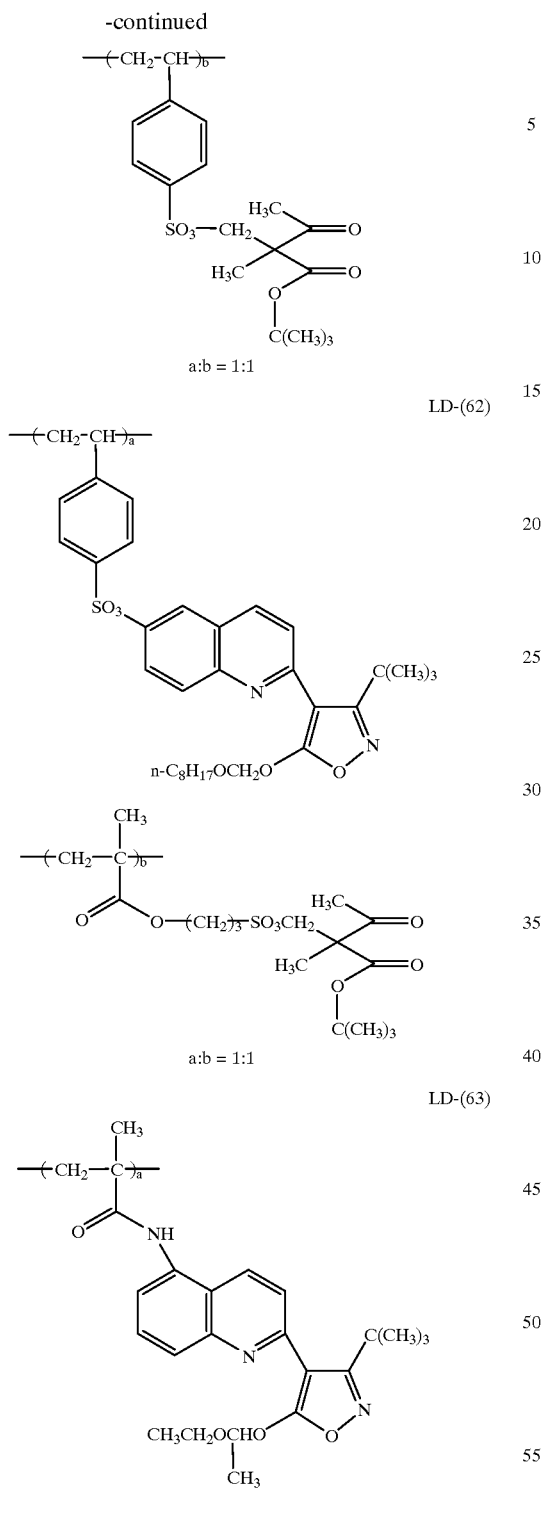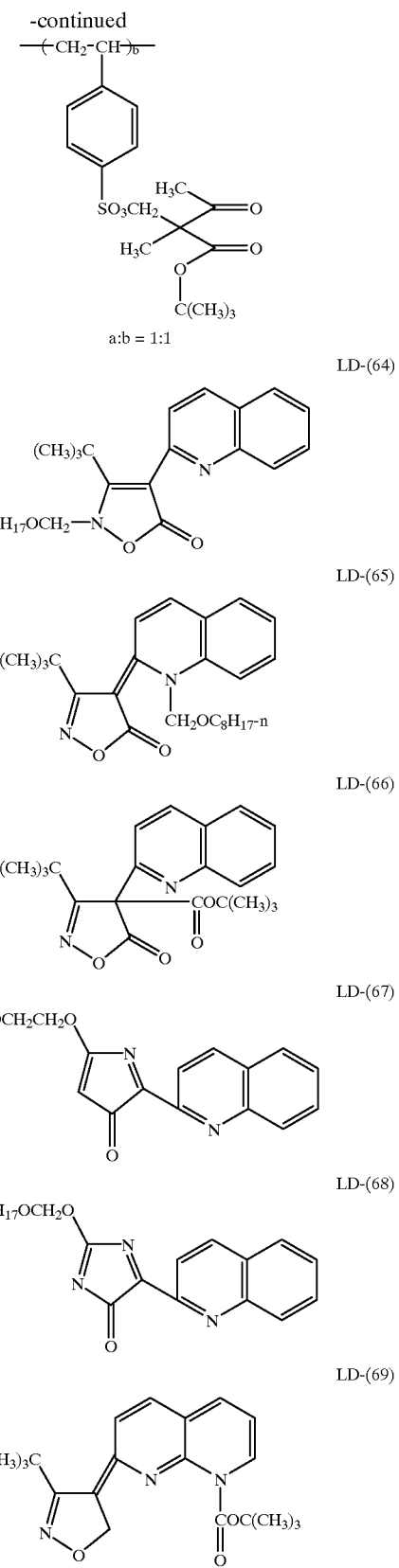

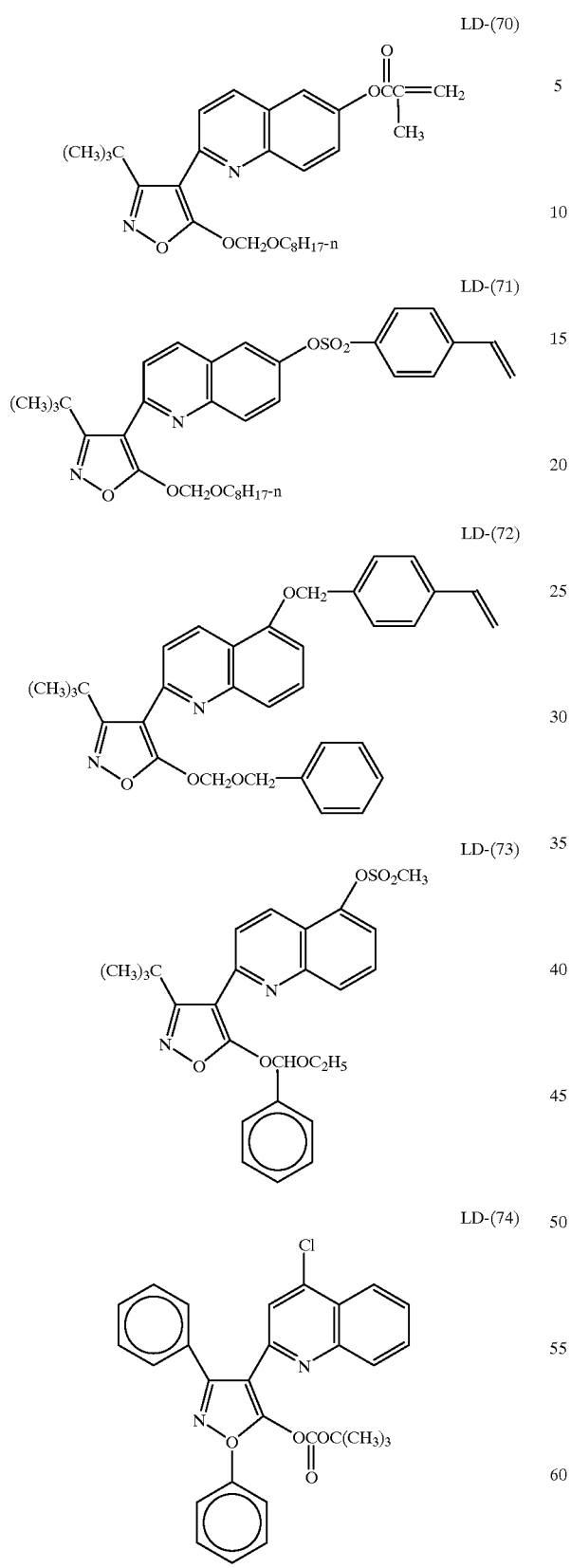
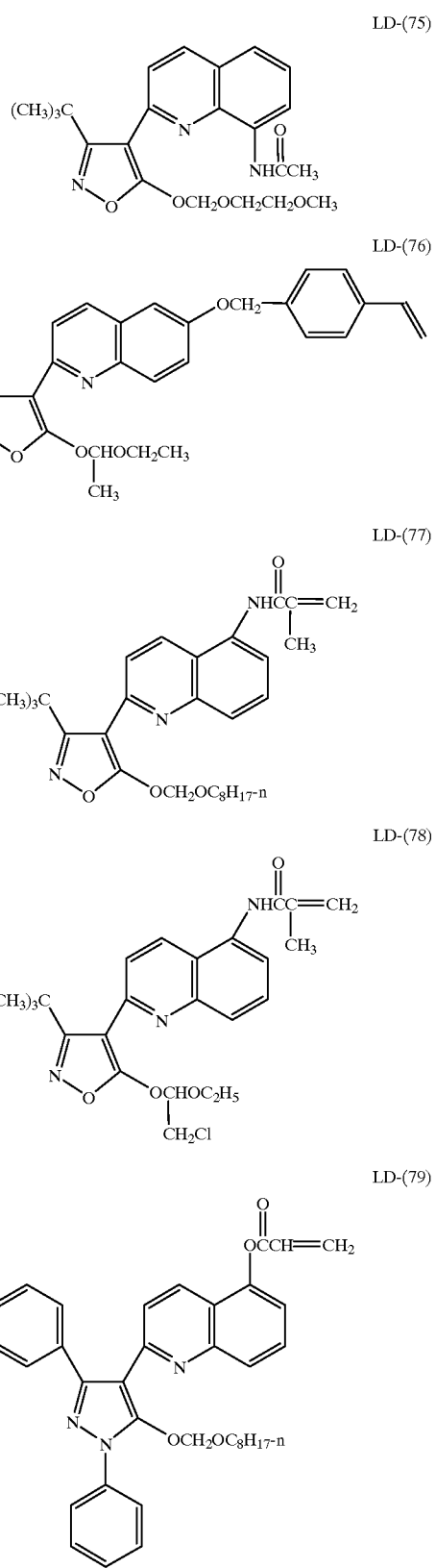

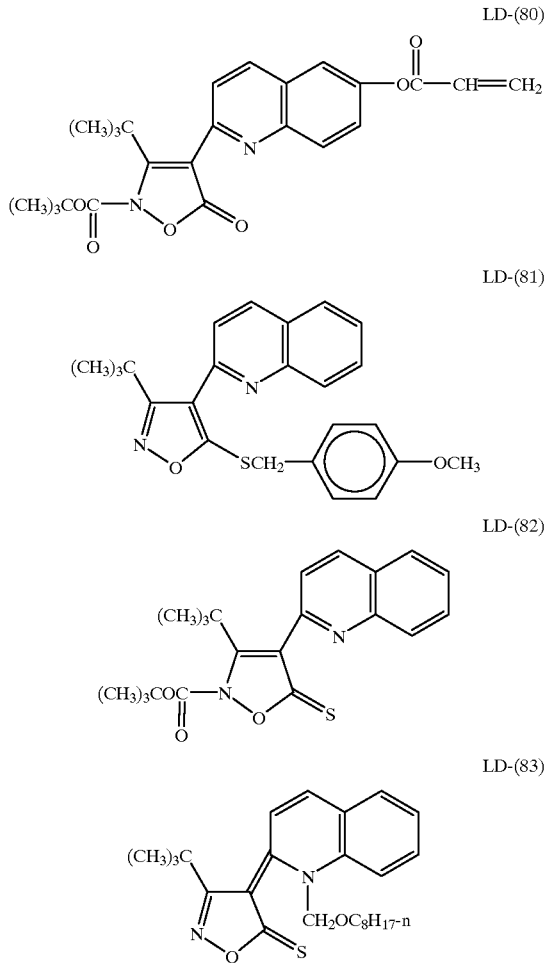

The leuco dye of the present invention can be synthesized by firstly synthesizing its corresponding dye in accordance with the method described for example in German Patent 2803104 and German Patent 2844606, allowing said dye to react with 1 equivalent of a strong base such as NaH-DBU (1,8-diazabicyclo[5.4.0]undec-7-ene) or t-BuOK in an aprotic solvent such as THF or DMAc and then adding from 1 to 10 equivalents of a protecting group-introducing reagent such as di-t-butyl-di-carbonate, alkylchloromethyl ether or trimethylchlorosilane to carry out the reaction at a temperature of from room temperature to about 60° C.

The leuco dye polymer of the present invention can be obtained by polymerizing the leuco dye monomer synthesized making use of the just described method, by various polymerization methods such as solution polymerization, precipitation polymerization, suspension polymerization, mass polymerization and emulsion polymerization. Examples of the polymerization initiation method include a method in which a radical initiator is used and a method in which a light or radial ray is irradiated. These polymerization methods and polymerization initiation methods are described for example in "High Polymer Synthesis Methods (written in Japanese)", edited by T. Tsuruta (revised edition, published by Nikkan Kogyo Shinbun, 1971) and "Methods for High Polymer Synthesis (written in Japanese)", edited by T. Ohtsu and M. Kinoshita, published by Kagaku Dohjin in 1972, pp. 124–154.

Among the aforementioned polymerization methods, a solution polymerization method in which a radical initiator is used is particularly desirable. Examples of the solvent to be used in the solution polymerization include various organic solvents such as ethyl acetate, methanol, ethanol, 1-propanol, 2-propanol, 1-butanol, acetone, dioxane, N,N-dimethylformamide, N,N-dimethylacetamide, benzene, toluene, acetonitrile, methylene chloride, chloroform and dichloroethane, which may be used alone, as a mixture of two or more or as a mixed solvent with water.

The polymerization temperature should be determined in relation, for example, to molecular weight of the polymer to be formed and kind of the initiator and is within the range of possibly from 0 to 100° C, but generally from 30 to 100° C. Since there is a possibility of causing decomposition of the leuco dye monomer at higher temperature, it is desirable to carry out the polymerization at a temperature of from 30 to 80° C. in the case of this invention.

Preferred examples of the radical initiator to be used in the polymerization include azo initiators such as 2,2'-azobisisobutyronitrile, 2,2'-azobis(2,4-dimethylvaleronitrile), 2,2'-azobis(2-amidinopropane) dihydrochloride and 4,4'-azobis(4-cyanopentanoic acid) and peroxide initiators such as benzoyl peroxide, t-butyl hydroperoxide and potassium persulfate (which may also be used as a redox initiator in combination with sodium hydrogen sulfite).

Amount of the initiator to be used can be adjusted in response to the polymerizing ability of monomers and molecular weight of the desired polymer and is preferably within the range of from 0.01 to 5.0 mol % based on the monomers.

Synthesis of the copolymer of the present invention may be effected by firstly mixing the monomers to be copolymerized, such as a leuco dye monomer and an acid generating monomer, in a reaction vessel and then adding an initiator to the vessel, or by carrying out the polymerization via a step in which these monomers are added dropwise to a polymerization solvent.

According to the image recording medium of the present invention, a compound which generates acid by the action of light or heat can be used together with the leuco dye of this invention.

As the compound which generates acid by the action of light, various examples (e.g., nonionic compounds such as a halide which generates hydrogen halide, a sulfonate which generates sulfonic acid, a carbonyl compound which generates carboxylic acid and a phosphorus compound which generates phosphoric acid and ionic compounds such as various onium salts) are described in "Organic Materials for Imaging Use", pp. 187–198 (1993), edited by Organic Electronics Material Research Institute, published by Bunshin Shuppan. All of these compounds can be used in the present invention. Also, in order to expand photosensitive range of these optical acid generators, various sensitizers (their examples are described for example in J. Polymer. Sci., 16, 2441 (1978)) can be added.

Though not particularly limited, illustrative examples of the compound which generates acid by the action of light, useful in the present invention, are shown below.

*Structures of compounds A-(1) through A-(20):*

- A-(1): Phenyl-CH=CH-(phenyl)-triazine with two CCl₃ groups
- A-(2): Phenyl-CH=CH-(1,3,4-oxadiazole)-CCl₃
- A-(3): 2,5-dichloro-(CCl₃)-benzene
- A-(4): Phenyl-SO₂CBr₃
- A-(5): 2-(CBr₃)-quinoline
- A-(6): CH₃-C₆H₄-SO₂OCH₂-(2,6-dinitrophenyl)
- A-(7): CH₃-C₆H₄-SO₂OCH₂-(2-nitrophenyl)
- A-(8): CH₃-C₆H₄-SO₂OC(CH₃)₂CO-cyclohexyl (with H)
- A-(9): Phenyl-SO₂CH₂CO-phenyl
- A-(10): CH₃-C₆H₄-SO₂OCH(phenyl)CO-phenyl
- A-(11): CH₃-C₆H₄-SO₂ON=C(CN)-phenyl
- A-(12): CH₃-C₆H₄-SO₂ON=C(phenyl)CO-phenyl
- A-(13): 3-(tosyloxy)quinazolin-4(3H)-one
- A-(14): 3,4-diphenyl-1-(SO₂CF₃)-maleimide (N-OSO₂CF₃)
- A-(15): CH₃-C₆H₄-SO₂OCH₂CO₂C(CH₃)₃
- A-(16): CH₃-C₆H₄-SO₂OCH₂CO-C₆H₄-O-(tetrahydropyran-2-yl)
- A-(17): (3-CH₃O-C₆H₄)-CH₂SO₂CH₂-(3-OCH₃-C₆H₄)
- A-(18): Phenyl-SO₂SO₂-phenyl
- A-(19): Phenyl-SO₂CH₂-(2-CH₃-phenyl)
- A-(20): Phenyl-SO₂CH₂SO₂-phenyl A-(21)
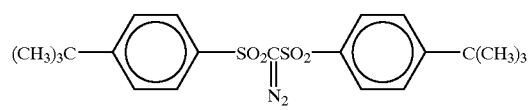
A-(22)
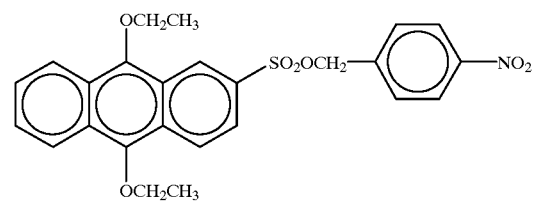
A-(23)
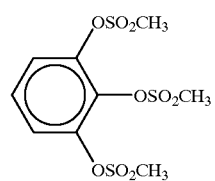
A-(24)
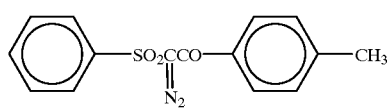
A-(25)
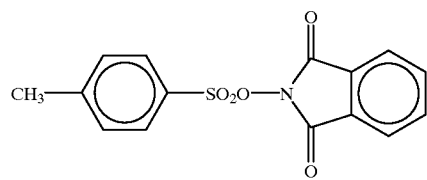
A-(26)
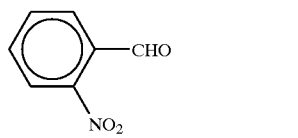
A-(27)
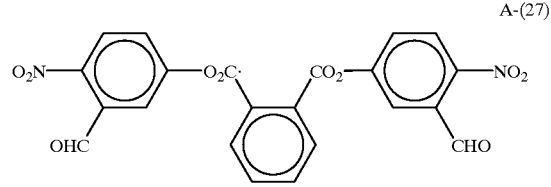
A-(28)
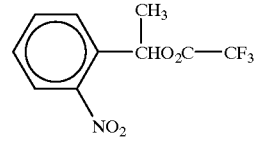
A-(29)
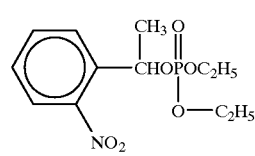
A-(30)
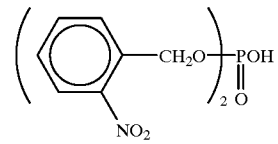
A-(31)
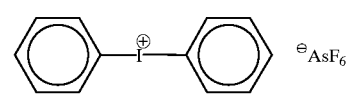
A-(32)
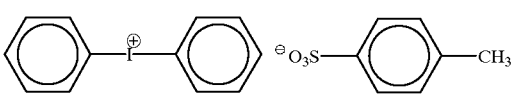
A-(33)
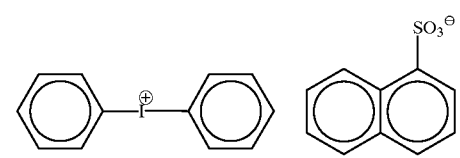
A-(34)
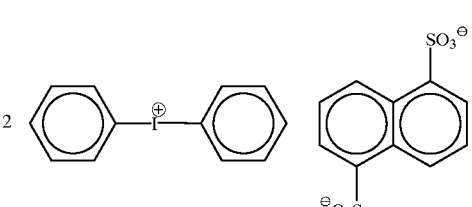
A-(35)
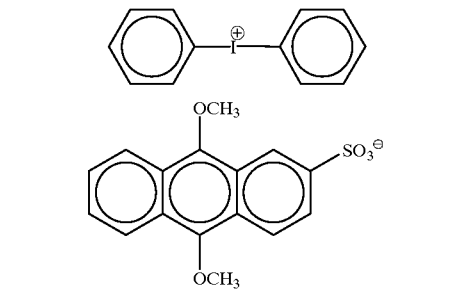
A-(36)
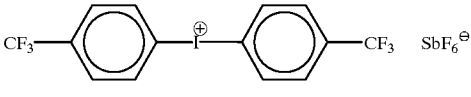
A-(37)
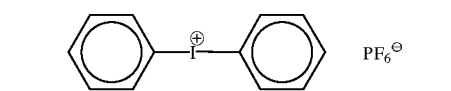
A-(38)
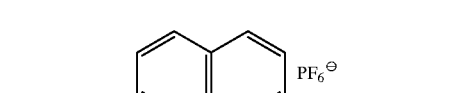
A-(39)
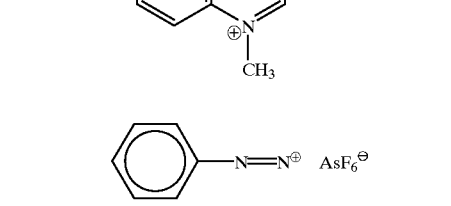

A-(40)
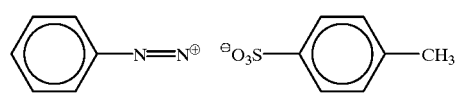

A-(41)
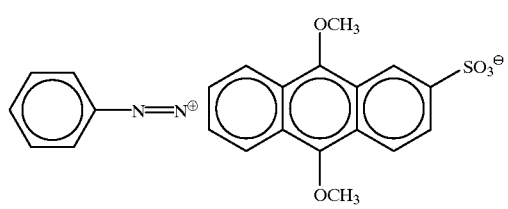

A-(42)
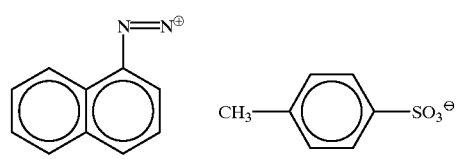

A-(43)
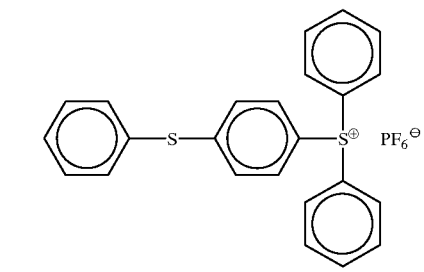

A-(44)
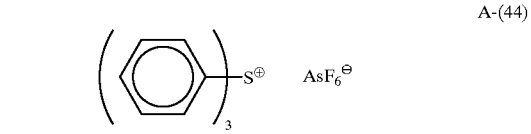

A-(45)
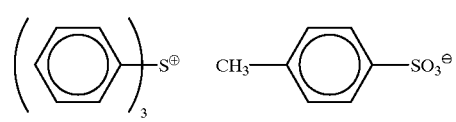

A-(46)
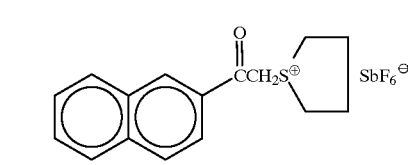

A-(47)
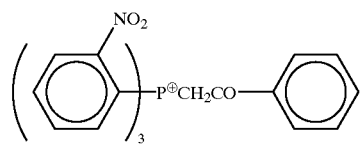
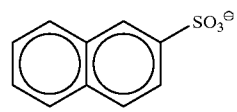

A-(48)
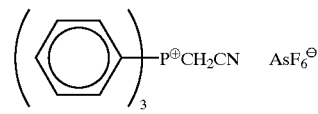

A-(49)
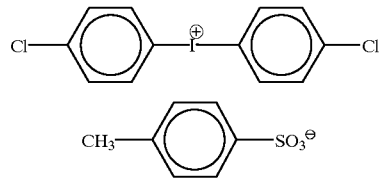

A-(50)
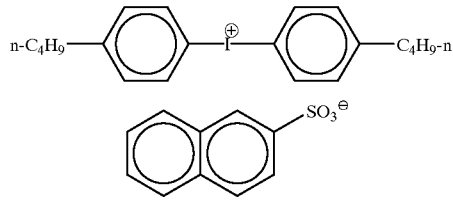

Examples of the compounds which generates acid by the action of heat include organic acid esters (such as t-butyl ester, cyclohexyl ester or isopropyl ester of sulfonic acid, carboxylic acid, phosphoric acid, etc.), aromatic onium salts (such as sulfonate, $PF_6^-$ salt, $AsF_6^-$ salt or $SbF_6^-$ salt of diazonium, iodonium, sulfonium, phosphonium, etc., also including the examples of the optical acid generator), an ammonium salt of amine complex of acid (such as a salt obtained by neutralizing an acid (e.g., p-toluenesulfonic acid, benzenesulfonic acid, 1,8-naphthalenedisulfonic acid, p-nitrobenzoic acid, $HPF_6$) with an amine (e.g., ammonia, methylamine, ethylamine, iso-propylamine, t-butylamine, aniline and pyridine), or a complex obtained by mixing the above amine with the complex $BF_3 \cdot Et_2O$).

Though not particularly limited, illustrative examples of the compound which generates acid by the action of heat, useful in the present invention, are shown below.

A-(51)
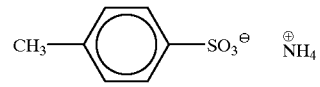

A-(52)
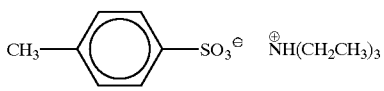

A-(53)
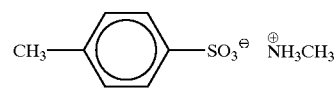

A-(54)
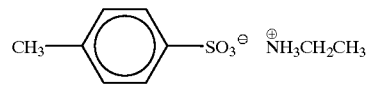

A-(55)

[structure: 3,5-dimethylbenzenesulfonate, n-butylammonium]
$H_3C$–C$_6H_2$(CH$_3$)–SO$_3^\ominus$ $\overset{\oplus}{N}H_3C_4H_9$-n

A-(56)

[naphthalene-1-sulfonate, n-butylammonium]
naphthyl–SO$_3^\ominus$ $\overset{\oplus}{N}H_3C_4H_9$-n

A-(57)

n-$C_8H_{17}SO_3^\ominus$ $\overset{\oplus}{N}H_4$

A-(58)

[1,5-naphthalenedisulfonate diammonium]

A-(59)

$-(CH_2-CH)_n-$
|
$C_6H_4$
|
$SO_3^\ominus$ $NH_4^\oplus$

A-(60)

$-(CH_2-CH)_n-$
|
$C_6H_4$
|
$SO_3^\ominus$ $\overset{\oplus}{N}H_2(CH_3)_2$

A-(61)

$O_2N$–$C_6H_4$–$CO_2^\ominus$ $\overset{\oplus}{N}H_4$

A-(62)

$C_6H_5$–$SO_2$–$C_6H_4$–$CO_2^\ominus$ $\overset{\oplus}{N}H(CH_2CH_3)_3$

A-(63)

2,4,6-trichlorobenzoate, methylammonium
Cl$_3C_6H_2$–$CO_2^\ominus$ $\overset{\oplus}{N}H_3CH_3$

A-(64)

2,4,6-trinitro, dimethylammonium benzoate
(O$_2$N)$_3$C$_6$H$_2$–CO$_2^\ominus$ $\overset{\oplus}{N}H_2(CH_3)_2$

A-(65)

$H_4\overset{\oplus}{N}$ $^\ominus O_2C$–$C_6H_4$–$SO_2$–$C_6H_4$–$CO_2^\ominus$ $\overset{\oplus}{N}H_4$

A-(66)

$H_4\overset{\oplus}{N}$ $^\ominus O_3S$–$C_6H_4$–$SO_2$–$C_6H_4$–$SO_3^\ominus$ $\overset{\oplus}{N}H_4$

A-(67)

$C_6H_5$–NH$_2$·BF$_3$

A-(68)

pyridinium $^\ominus$PF$_6$

A-(69)

quinoline·BF$_3$

A-(70)

$(CH_3CH_2)_3N$·BF$_3$

A-(71)

$CH_3NH$·BF$_3$

A-(72)

1-naphthyl–NH$_2$·BF$_3$

A-(73)

2-naphthyl–NH$_2$·BF$_3$

A-(74)

$CH_3$–$C_6H_4$–$SO_2$–O–CH(CH$_3$)(C$_6$H$_5$)

A-(75)

$CH_3$–$C_6H_4$–$SO_2$–O–CH(C$_6$H$_5$)–CH$_2$–C$_6$H$_5$

-continued
A-(76)
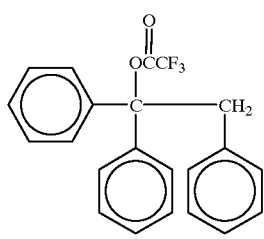
A-(77)
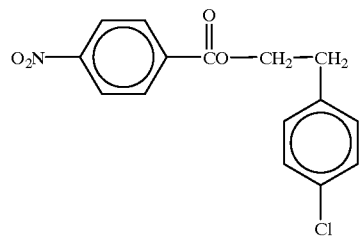
A-(78)
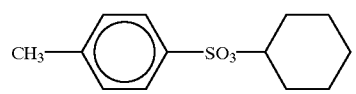
A-(79)
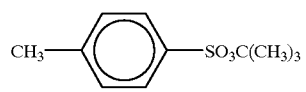
A-(80)
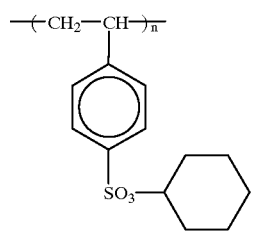
A-(81)
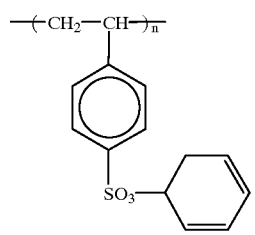
A-(82)
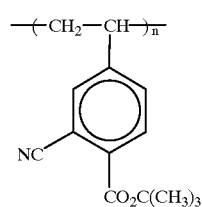
-continued
A-(83)
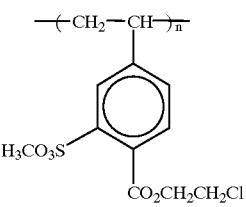
A-(84)
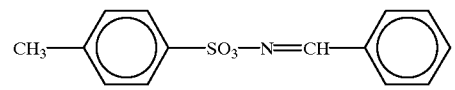
A-(85)
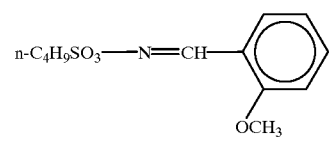
A-(86)
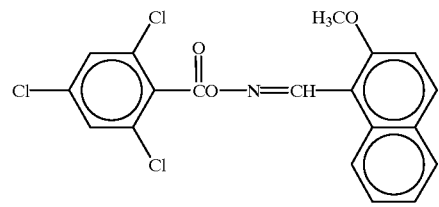
A-(87)
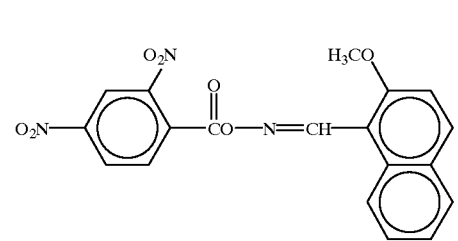
A-(88)
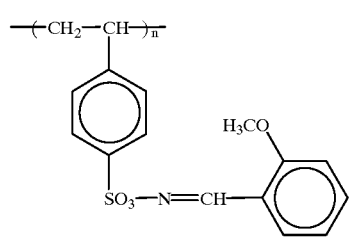
A-(89)
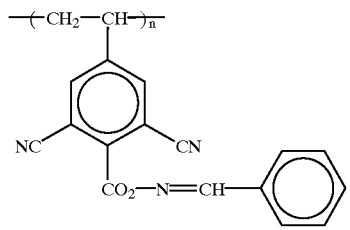

A-(90)
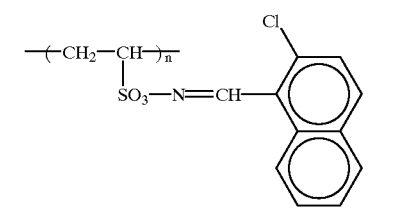
A-(91)
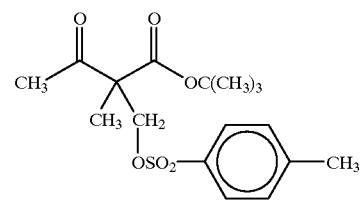
A-(92)
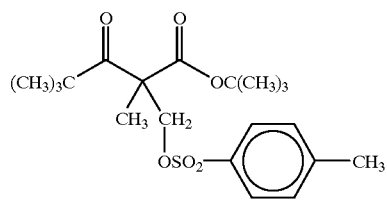
A-(93)
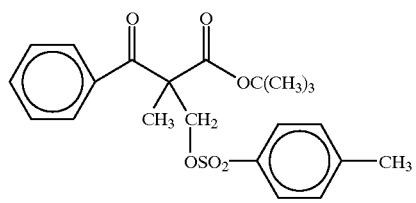
A-(94)
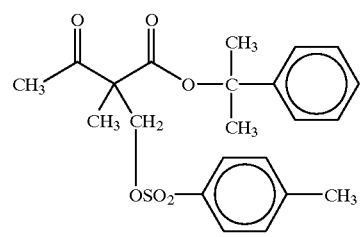
A-(95)
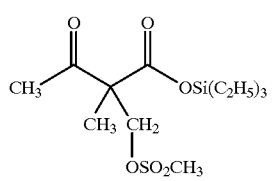
A-(96)
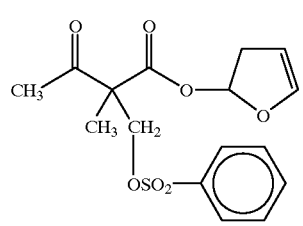
A-(97)
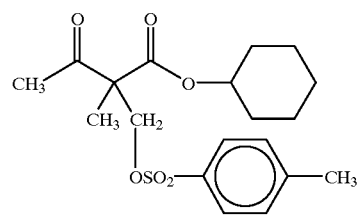
A-(98)
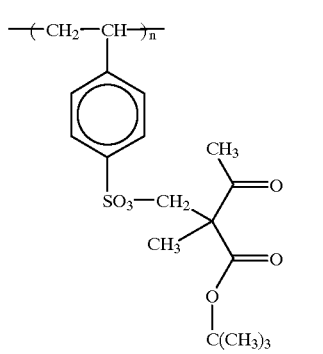
A-(99)
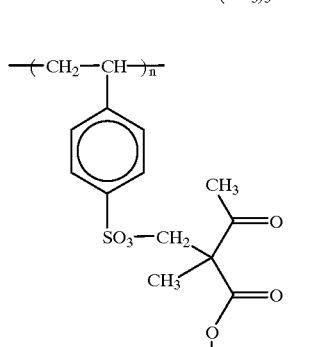
A-(100)
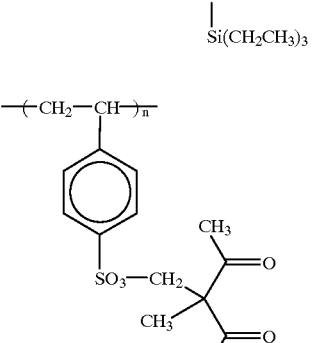

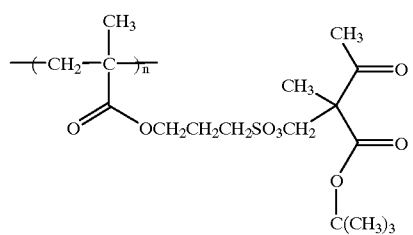
A-(101)
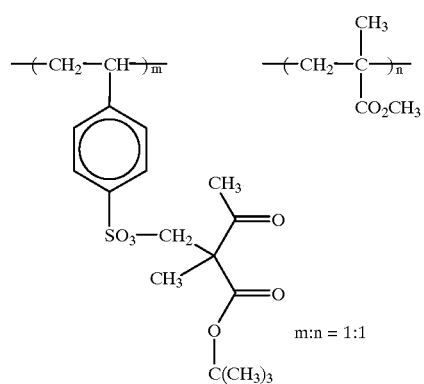
A-(102)
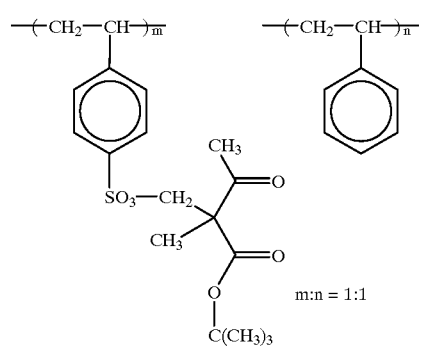
A-(103)
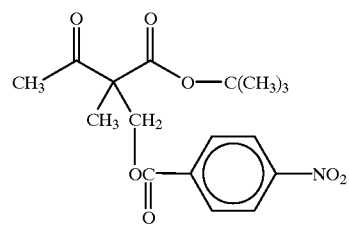
A-(104)
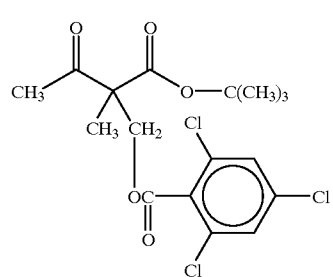
A-(105)
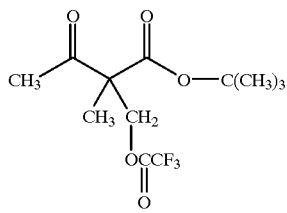
A-(106)
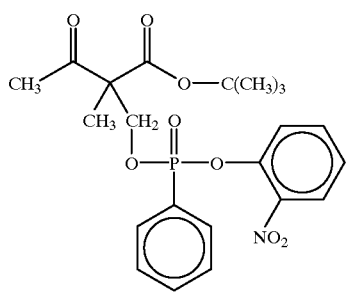
A-(107)
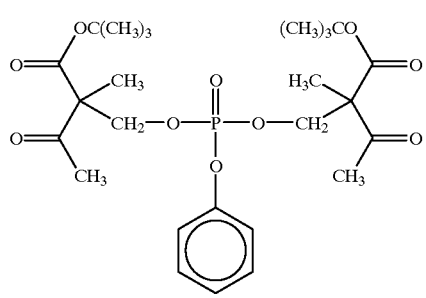
A-(108)
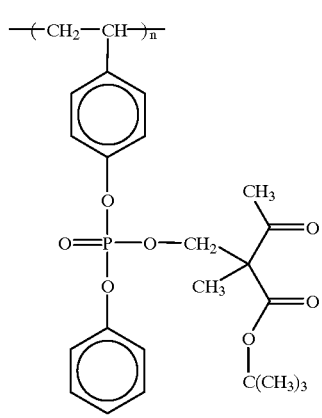
A-(109)

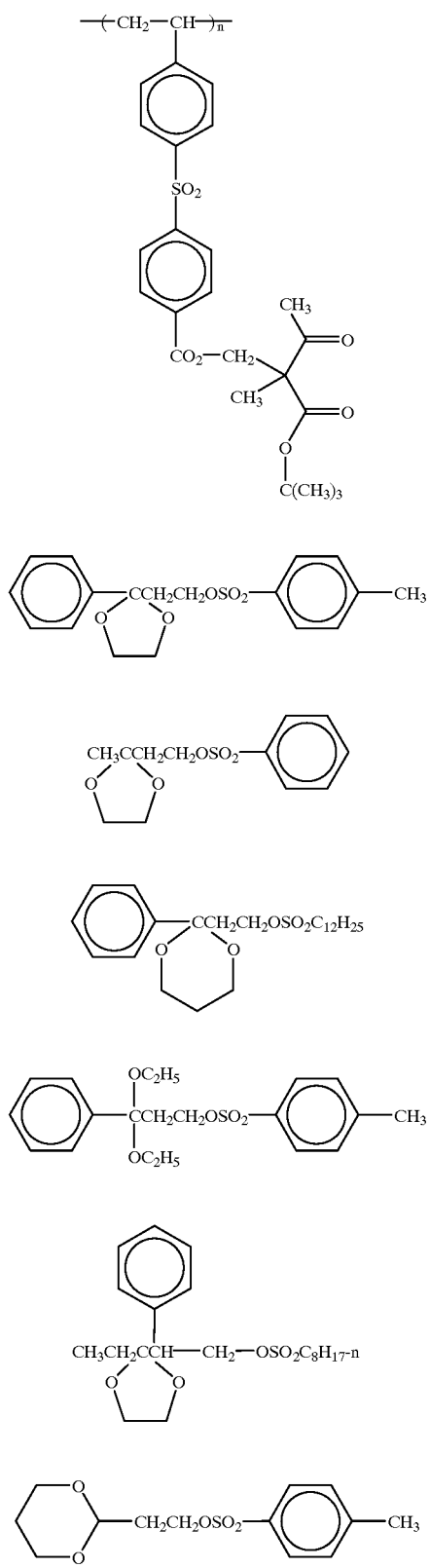
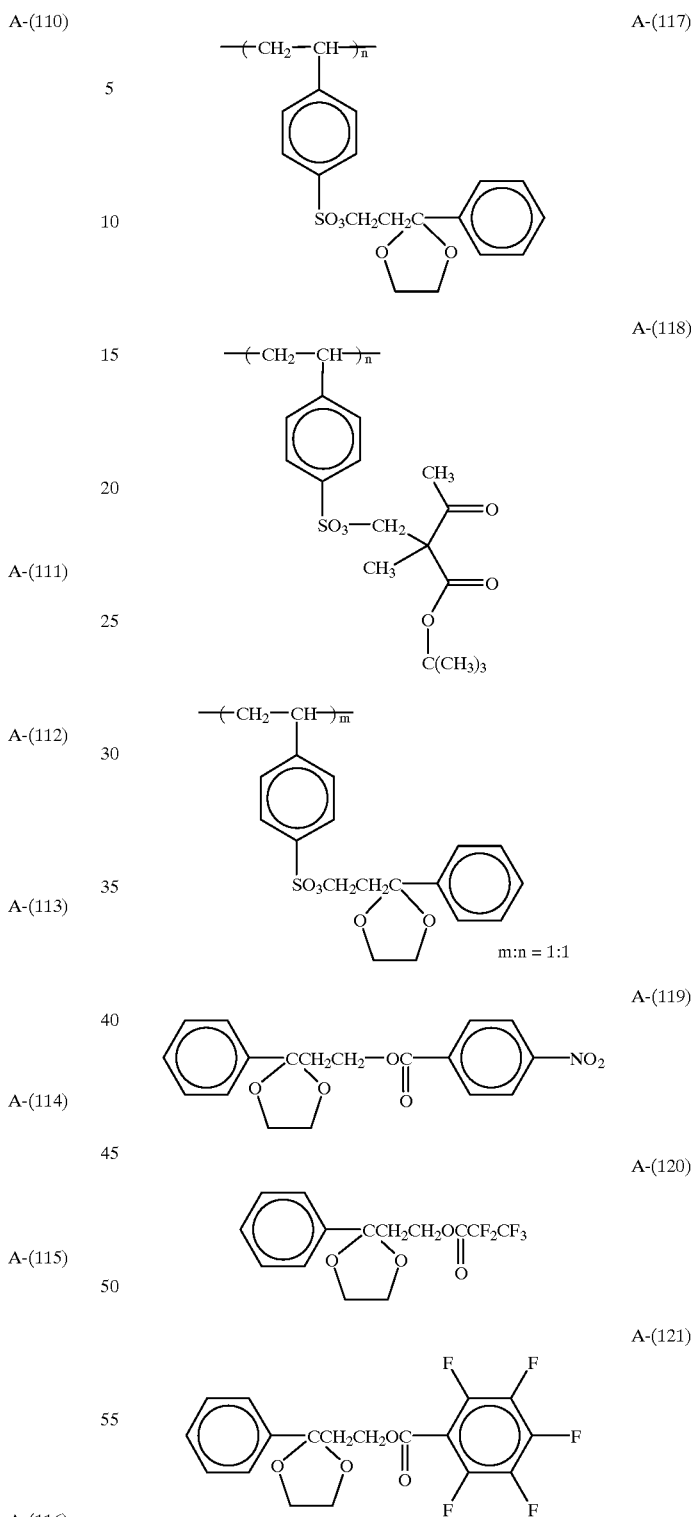

-continued
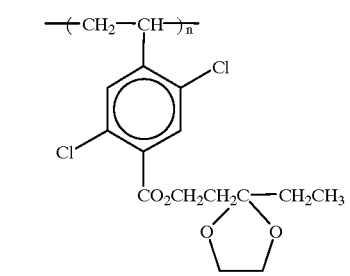
A-(122)
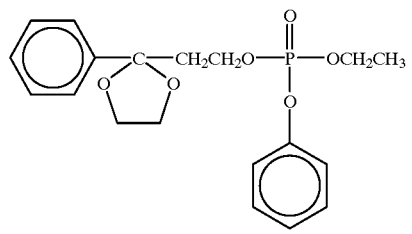
A-(123)
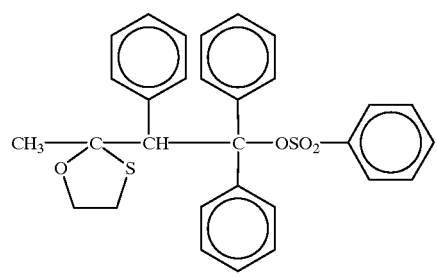
A-(124)
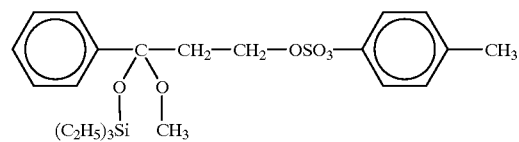
A-(125)
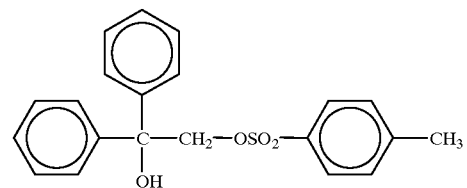
A-(126)
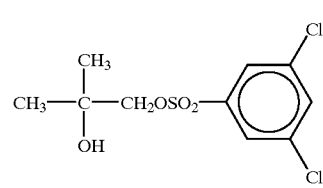
A-(127)
-continued
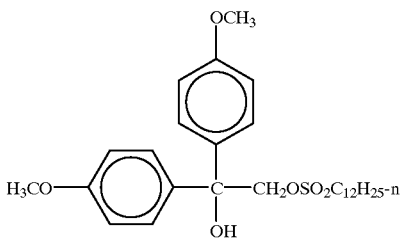
A-(128)
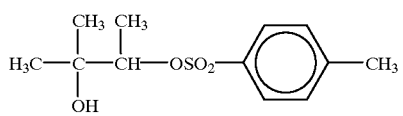
A-(129)
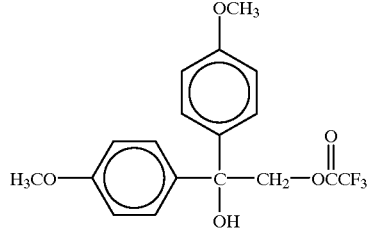
A-(130)
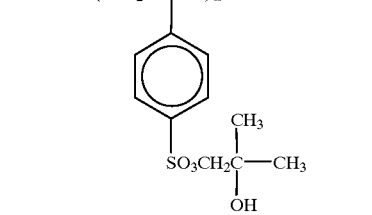
A-(131)
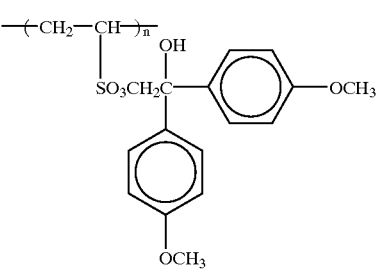
A-(132)
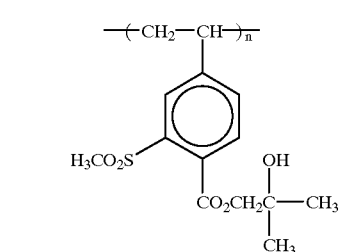
A-(133)
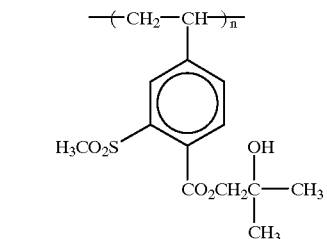
A-(134)

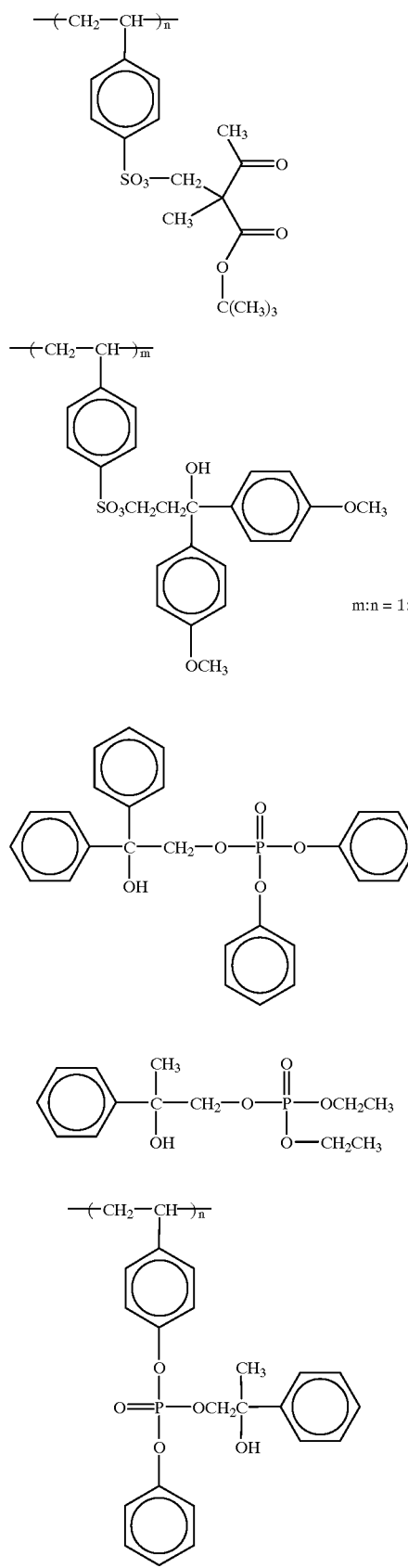

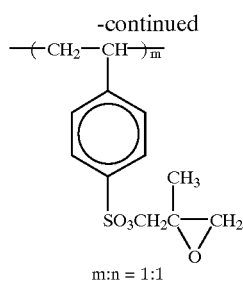

A-(146)

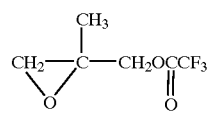

A-(147)

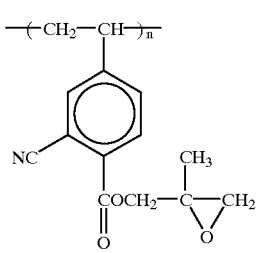

A-(148)

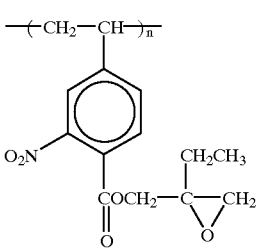

A-(149)

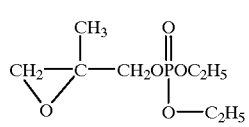

A-(150)

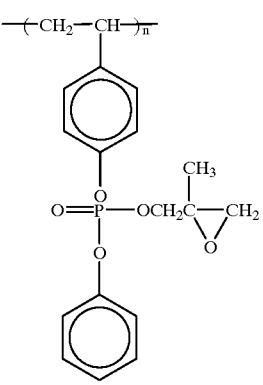

Some of the above acid generators have an effect of promoting its own decomposition by the action of acid generated by itself.

According to the present invention, all of these thermal acid generators can be used, but preferably having a decomposition temperature of from 130 to 300° C., more preferably from 150 to 250° C.

Sensitivity and shell life of recording materials can also be controlled by adjusting the amount of the above compounds generating acid by the action of light or heat, and they are added in an amount of preferably from 0.1 to 20 equivalents, more preferably from 0.1 to 5 equivalents, based on the leuco dye of the present invention.

The image recording medium of the present invention is prepared generally by coating a support (base) with the aforementioned leuco dye, and optionally an acid generator. In that case, a binder is allowed to coexist in general, except for a case in which any one of these compounds is a polymer or in the amorphous form having high coating ability. Also, in order to obtain desired absorption characteristics for each purpose, the medium may contain other leuco dyes which develop color by the action of heat or acid (e.g., those which are described in JP-A-4-124175, JP-A-5-278342, JP-A-6-227139, JP-A-5-281654, JP-A-5-294977, JP-A-6-255256, U.S. Pat. No. 4,602,263 and U.S. Pat. No. 4,826,976). Also, in order to improve storage stability of the image recording medium, a small amount of a base may be added, or various additives such as a pigment, an antioxidant and a sticking inhibitor may be added as occasion demands. In addition, an overcoat layer may be arranged in order to protect the image forming layer, or a back-coat layer may be arranged on the backside of the support. In this connection, various known techniques for thermosensitive recording materials can be used, such as arrangement of a single or multiple undercoat layer comprising a pigment or resin between the image forming layer and the support.

It is desirable to use an organic base as the base to be added, and its preferred examples include guanidine derivatives (e.g., 1,3-diphenylguanidine, 1,3-dimethylguanidine, 1,3-dibutylguanidine, 1-benzylguanidine and 1,1,3,3-tetramethylguanidine), aniline derivatives (e.g., aniline, p-t-butylaniline, N,N'-dimethylaniline, N,N'-dibutylaniline and triphenylamine), alkylamine derivatives (e.g., tributylamine, octylamine, laurylamine, benzylamine and dibenzylamine) and heterocyclic compounds (e.g., N,N'-dimethylaminopyridine, 1,8-diazabicyclo[5.4.0]-7-undecene, triphenylimidazole, lutidine and 2-picoline). These bases are added in an amount of preferably from 0.01 to 100 mol %, more preferably from 0.1 to 20 mol %, based on the acid generator.

Any of water-soluble binders such as gelatin, casein, starches, hydroxyethyl cellulose, carboxymethyl cellulose, polyvinyl alcohol, polyacrylamide and ethylene-maleic anhydride copolymer and water-insoluble binders such as polyvinyl butyral, triacetyl cellulose, polystyrene, methyl acrylate-butadiene copolymer and acrylonitrile-butadiene copolymer can be used as the binder.

When a pigment is used, diatomaceous earth, talc, kaolin, sintered kaolin, titanium oxide, silicon oxide, magnesium carbonate, calcium carbonate, aluminum hydroxide and urea-formalin resin can be cited as its examples.

Examples of other additives include ultraviolet absorbers such as of benzophenone and benzotriazole systems, head abrasion and sticking inhibitors comprising higher fatty acid metal salts such as zinc stearate and calcium stearate and waxes such as paraffin, paraffin oxide, polyethylene, polyethylene oxide and castor wax, and these additives may be added as occasion demands.

Examples of the support (base) to be used in the image recording medium of the present invention include papers such as wood-free paper, baryta paper, coat paper, cast-coated paper and synthetic paper and polymer films such as of polyethylene, polypropylene, polyethylene terephthalate, polyethylene-2,6-naphthylene dicarboxylate, polyallylene, polyimide, polycarbonate, triacetyl cellulose, as well as glass, metal foil and non-woven fabric.

A transparent support (base) is used when the image recording medium of the present invention is applied to transmission type image uses such as OHP films and process films. Also, a support (base) which has small coefficient of thermal expansion and excellent dimensional stability and does not have absorption in the photosensitive region of PS plate is selected when used in process films.

A heat mode image recording is carried out when the acid generator contained in the image recording medium of the present invention is a compound which generates acid by the action of acid.

In that case, examples of the heating method as image forming means include a method in which the recording material is contacted with a heated block or plate, a method in which it is contacted with a hot roller or hot drum, a method in which it is irradiated with a halogen lamp or infrared or far infrared lamp heater, a method in which it is heated into an image shape with the heating head of a thermal printer and a method in which it is irradiated with laser beam, of which the laser irradiation method is desirable when a high resolution is required such as the case of plate making material applications. Also, in order to effect formation of images with more smaller thermal energy, the thermosensitive recording material of the present invention may be heated in advance to an appropriate temperature.

When images are formed by laser beam irradiation, it is necessary to include a dye which absorbs a light of the wave length of laser beam for the purpose of converting said laser beam into thermal energy. Examples of the laser beam source include excimer laser, argon laser, helium neon laser, semiconductor laser, glass (YAG) laser, carbon dioxide laser and dye laser, of which helium neon laser, semiconductor laser and glass laser are useful laser sources of the present invention. Among them, the semiconductor laser is particularly useful because of the small and inexpensive apparatus. Since the oscillation wave length of semiconductor laser is generally from 670 to 830 nm, a dye having an absorption at said near infrared is used. Examples of the near infrared-absorbing dye to be used include cyanine dye, squarylium dye, merocyanine dye, oxonol dye and phthalocyanine dye.

According to the present invention, images can be amplified by effecting imagewise generation of an acid catalyst from the thermal acid generator by the aforementioned heating method and then carrying out overall heating. In that case, it is essential that the overall heating is carried out at such a level of temperature that decomposition of the acid generator does not occur in the non-image parts and, when applied to plate making materials, dimensional stability of the base can be guaranteed. According to the present invention, the heat developing temperature is within the range of preferably from 60 to 150° C., more preferably from 80 to 120° C.

When the acid generator included in the image recording medium of the present invention is a compound which generates acid by the action of light, the laser beam source is selected in response to the absorption wave length of said acid generator or a sensitizer added to expand the photosensitive region. Heat developing after the laser exposure can be carried out in the same manner as the case of the use of the thermal acid generator.

EXAMPLES

Examples of the present invention are given below by way of illustration and not by way of limitation.

Synthesis examples of typical leuco dyes of the present invention are shown in the following. Leuco dyes other than the leuco dyes of the present invention can also be synthesized in the same manner.

Synthesis Example 1

Synthesis of Illustrative Compound LD-(24)

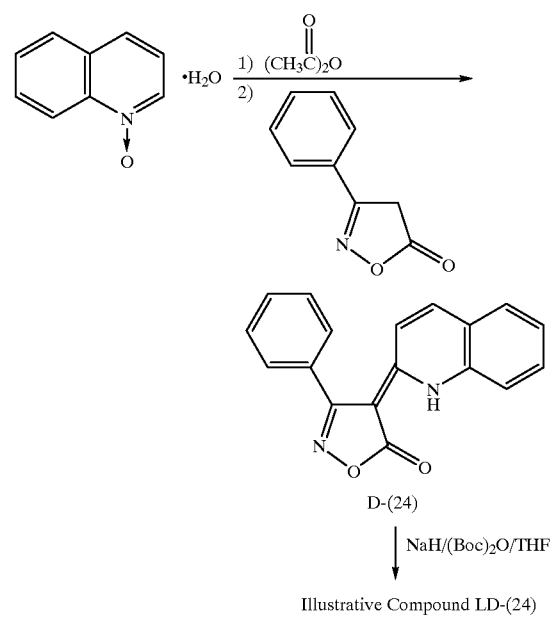

When 4.16 g of acetic anhydride was added to 4.5 g of quinoline-N-oxide monohydrate and stirred at room temperature for 1 hour, the system became uniform. This solution was mixed with 5 g of 3-phenylisoxazolone suspended in 10 ml of chloroform, and the mixture was stirred at room temperature for 3 hours. The reaction solution was washed with water, dried with magnesium sulfate and then concentrated. The thus obtained oily substance was purified by a silica gel column chromatography (developing solvent; n-hexane/ethyl acetate=1/1) and then mixed with methanol to obtain 1.75 g of a lemon yellow dye (D-(24)) (melting point 223–224° C., $\lambda$max=423 nm ($\epsilon$=16200) (in ethyl acetate)).

Next, 1 g of the thus obtained dye (D-(24)) was dissolved in 10 ml of THF to which was subsequently added 139 mg of oil dispersion of sodium hydride (content, 60%). This was further mixed with 6.2 g of di-t-butyl dicarbonate and heated under reflux for 30 minutes. The reaction solution was mixed with ethyl acetate and washed with water to extract the organic layer which was then dried with magnesium sulfate and concentrated. The thus obtained oily substance was purified by a silica gel column chromatography (developing solvent; n-hexane/ethyl acetate=1/1) to obtain 450 mg of LD-(24) as colorless crystals (melting point 137–138° C., $\lambda$max=335 nm ($\epsilon$=14800) (in ethyl acetate). Its structure was identified by NMR and mass spectrometry.

Synthesis Example 2
Synthesis of Illustrative Compound LD-(32)

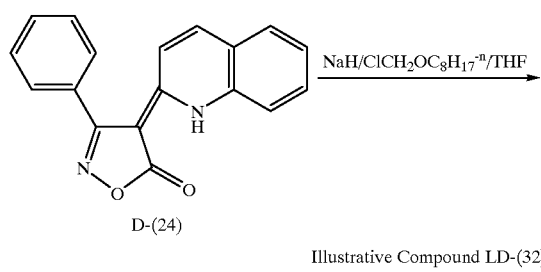

Illustrative Compound LD-(32)

A 0.3 g portion of the dye D-(24) obtained by the method described in Synthesis Example 1 was dissolved in 3 ml of THF to which was subsequently added 41.6 mg of oil dispersion of sodium hydride (content, 60%). This was further mixed with 0.2 ml of chloromethyl octyl ether and stirred at room temperature for 3 hours. The reaction solution was mixed with ethyl acetate and washed with water to extract the organic layer which was then dried with magnesium sulfate and concentrated. The thus obtained oily substance was purified by a silica gel column chromatography (developing solvent; n-hexane/ethyl acetate=3/1) to obtain 250 mg of LD-(32) as colorless oil ($\lambda$max=340 nm ($\epsilon$=12800) (in ethyl acetate)). Its structure was identified by $^1$H-NMR and mass spectrometry.

Synthesis Example 3
Synthesis of LD-(30) and LD-(64)

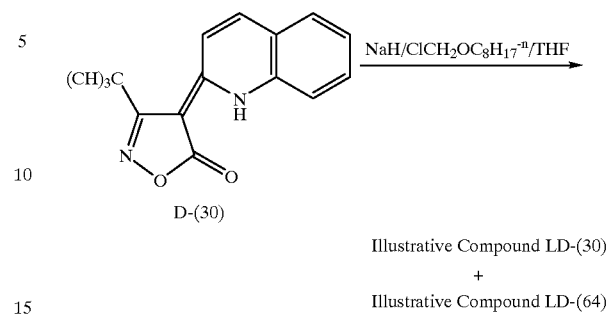

Illustrative Compound LD-(30)
+
Illustrative Compound LD-(64)

10 g of Dye D-(30) ($\lambda$max=424 nm ($\epsilon$=15500) (in ethyl acetate)) obtained according to the method described in Synthetic Example 1 was subjected to act with sodium hydride and chloromethyl octyl ether in THF, and then purified by a silica gel column chromatography in the same manner as in Synthetic Example 2. Accordingly, LD-(30) (2.4 g) was obtained as white crystals (melting point 62.0–62.5° C., $\lambda$max=319.0 nm ($\epsilon$=7340) (in ethyl acetate)) and LD-(64) (5.7 g) was obtained as colorless oil ($\lambda$max= 37.0 nm (in ethyl acetate)). Their structures were identified by $^1$H-NMR and mass spectrometry.

Synthesis Example 4
Synthesis of Copolymer LD-(53)

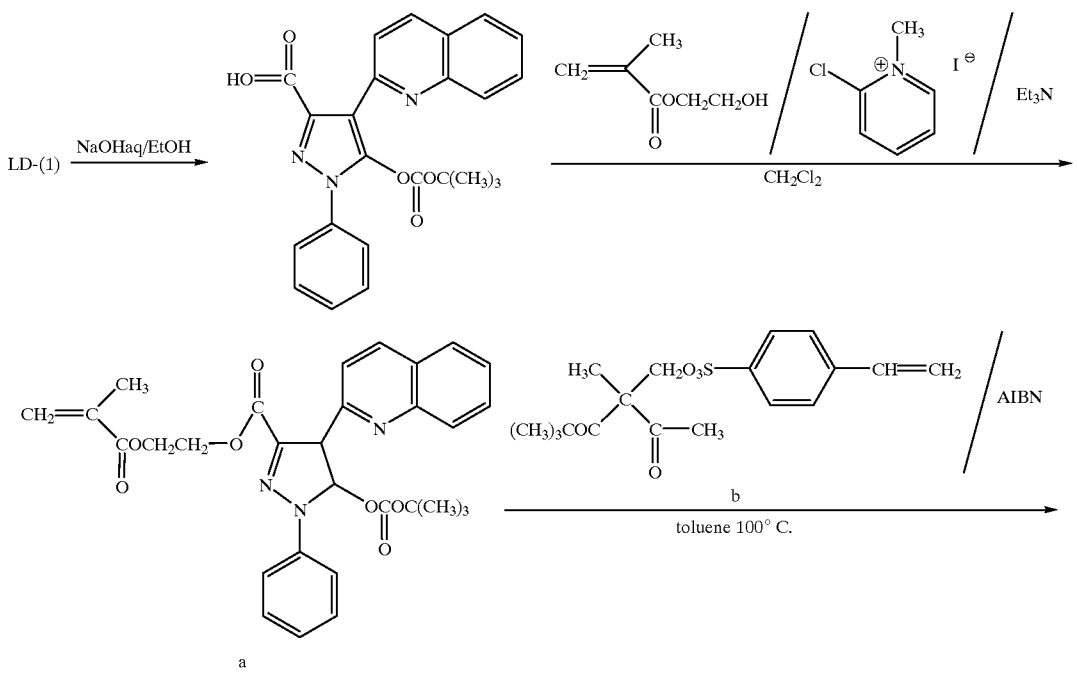

Illustrative Compound LD-(53)

A portion of LD-(1) synthesized by the same method of Synthesis Example 1 was hydrolyzed while cooling in an ice bath and then condensed with 2-hydroxyethyl methacrylate using 2-chloro-1-methylpyridinium iodide as the condensing agent to obtain a leuco dye monomer (a).

An acid generator monomer (b) synthesized by the method described in *Chem. Lett.*, 551 (1995) was copolymerized with the just described leuco dye monomer (a) using AIBN as the initiator, thereby obtaining the title compound LD-(53) (Mw $5.3 \times 10^5$, thermal decomposition starting temperature 140.7° C.).

Examples of the absorption (in ethyl acetate) of leuco dyes of the present invention and their color formers summarized in the following Table A are shown in FIGS. 1 to 7.

TABLE A

Figure 2:
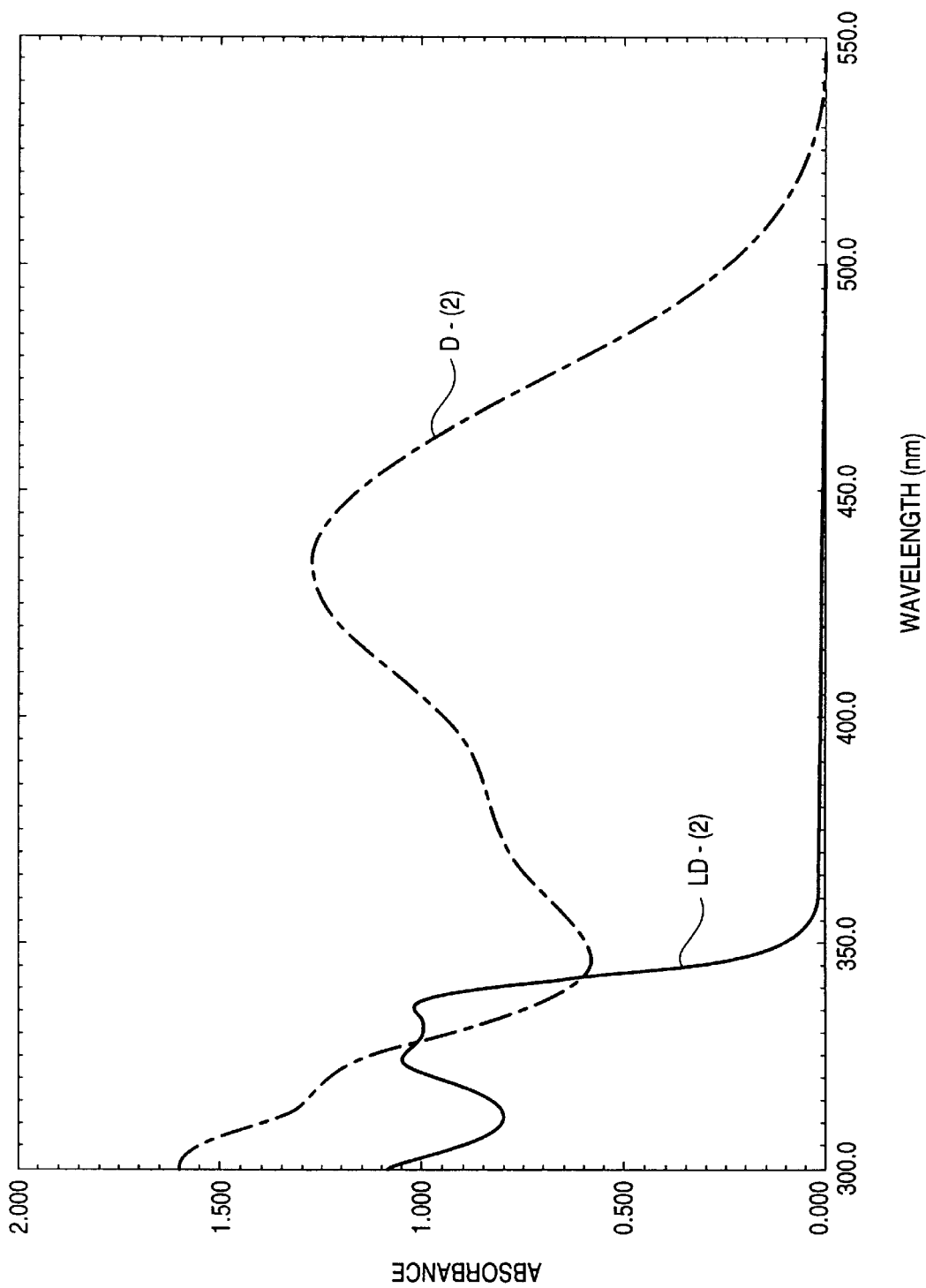
FIG. 2 is a graph showing absorption chart of the color former of leuco dye LD-(2) (in ethyl acetate).
Figure 3:
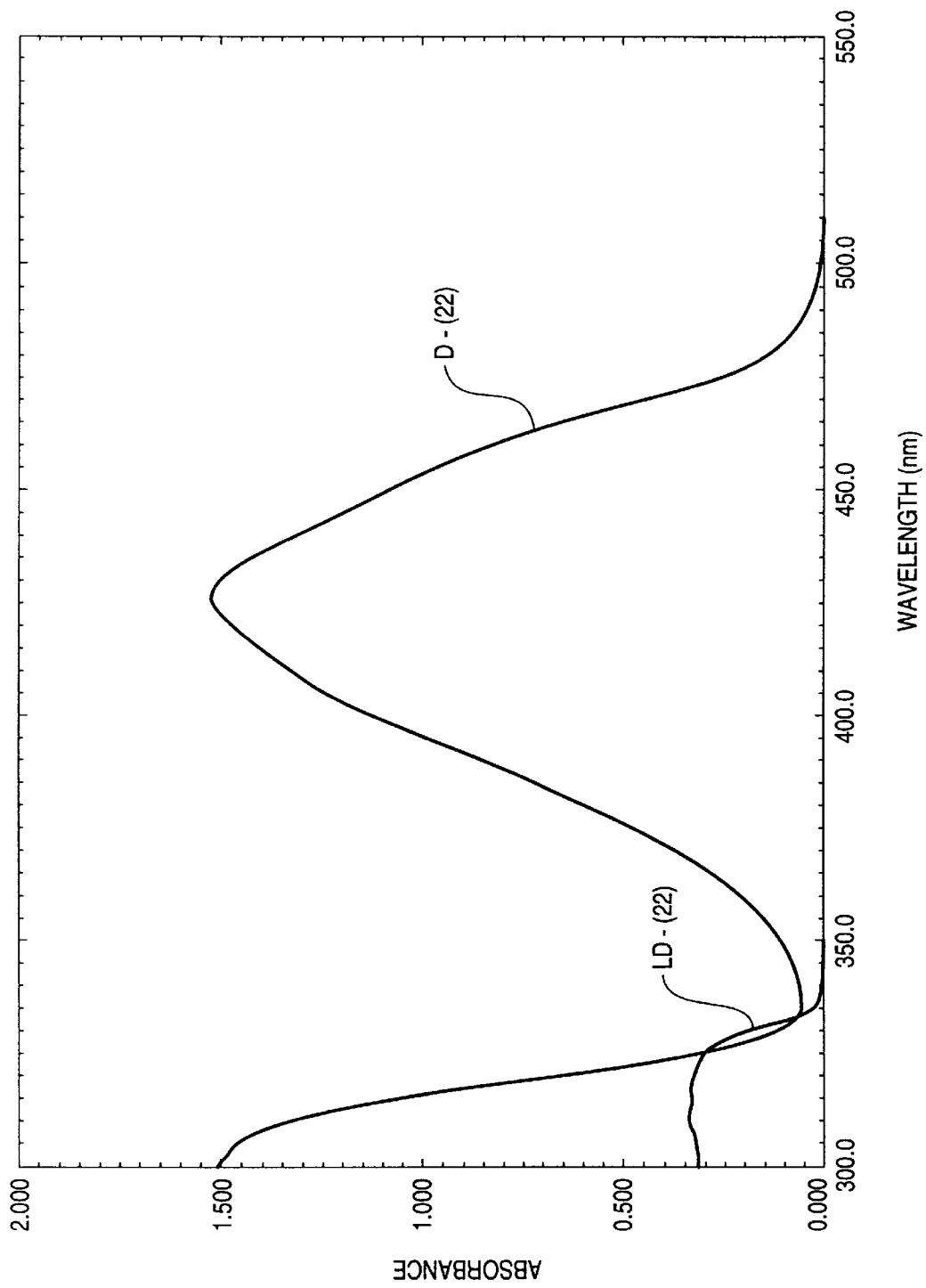
FIG. 3 is a graph showing absorption chart of the color former of leuco dye LD-(22) (in ethyl acetate).
Figure 4:
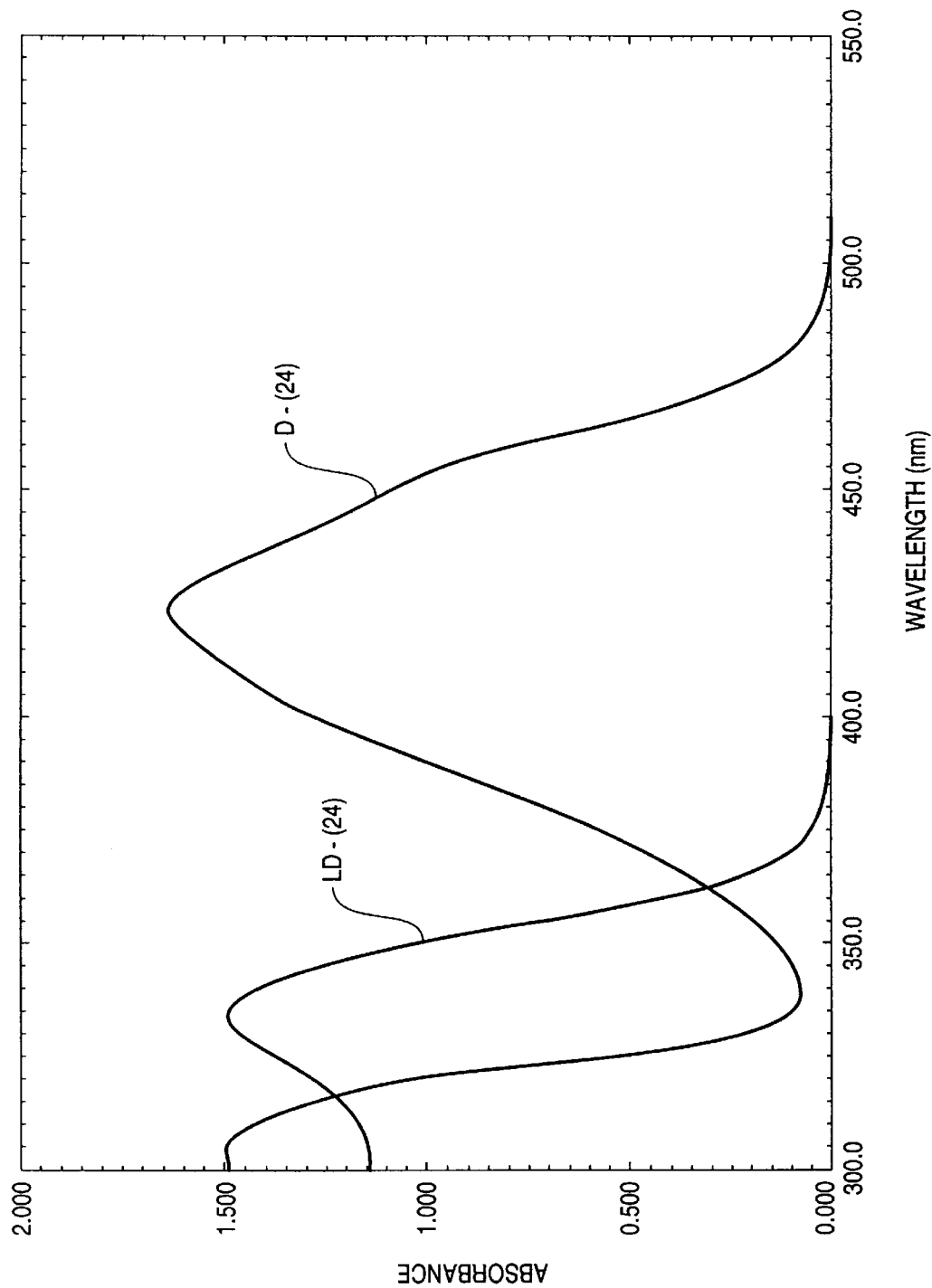
FIG. 4 is a graph showing absorption chart of the color former of leuco dye LD-(24) (in ethyl acetate).
Figure 5:
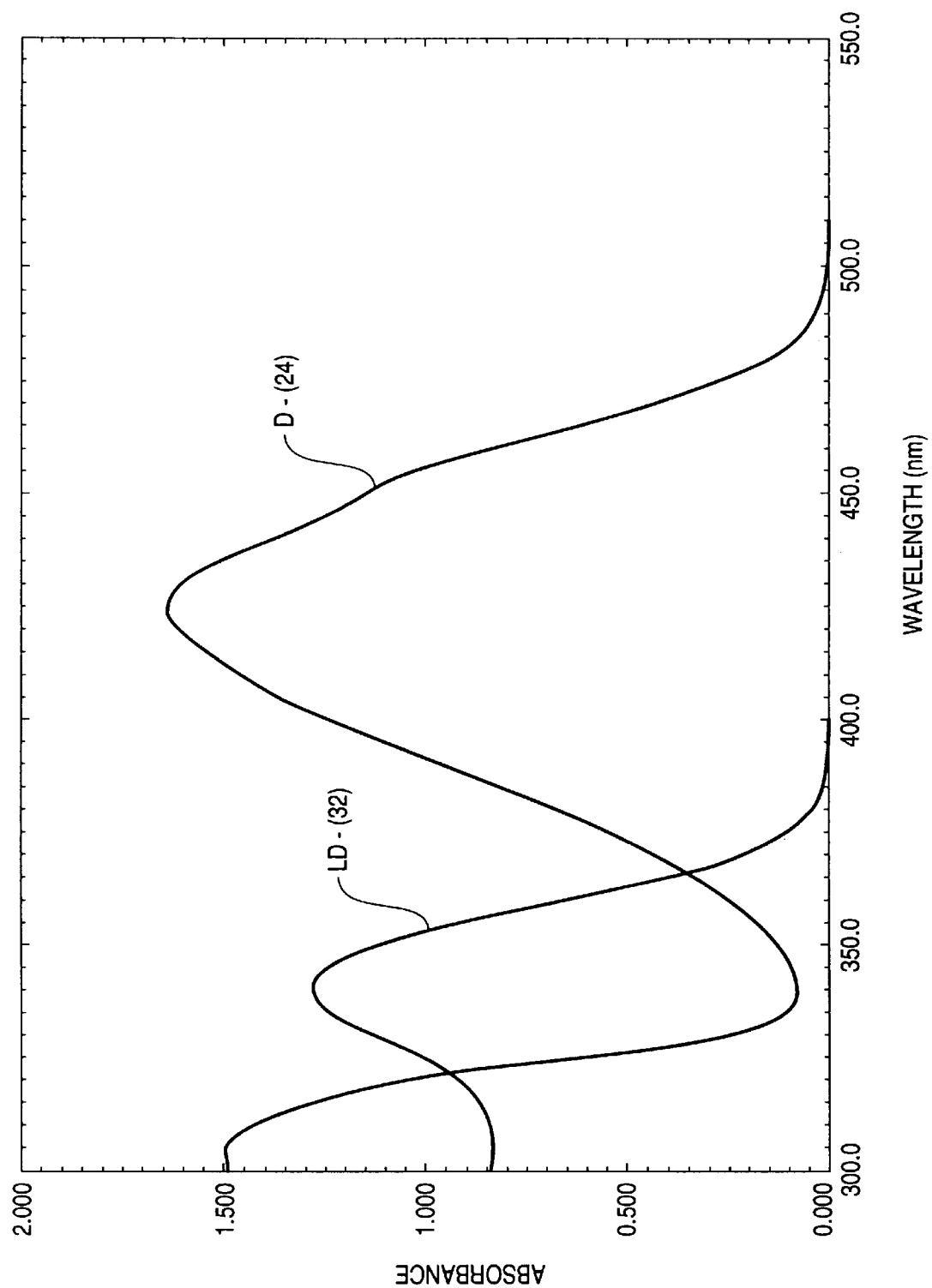
FIG. 5 is a graph showing absorption chart of the color former of leuco dye LD-(32) (in ethyl acetate).

| Absorption chart | Leuco dye | Color Former |
|---|---|---|
| FIG. 1 | LD-(1) | 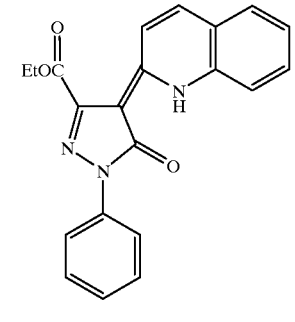 D-(1) |
| FIG. 2 | LD-(2) | 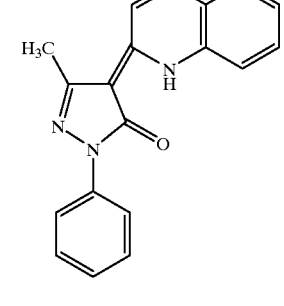 D-(2) |
| FIG. 3 | LD-(22) | 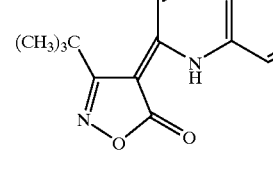 D-(22) |
| FIG. 4 | LD-(24) | 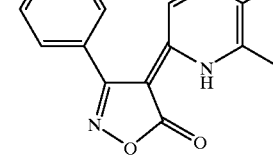 D-(24) |
| FIG. 5 | LD-(32) | D-(24) |

TABLE A-continued

Figure 6:
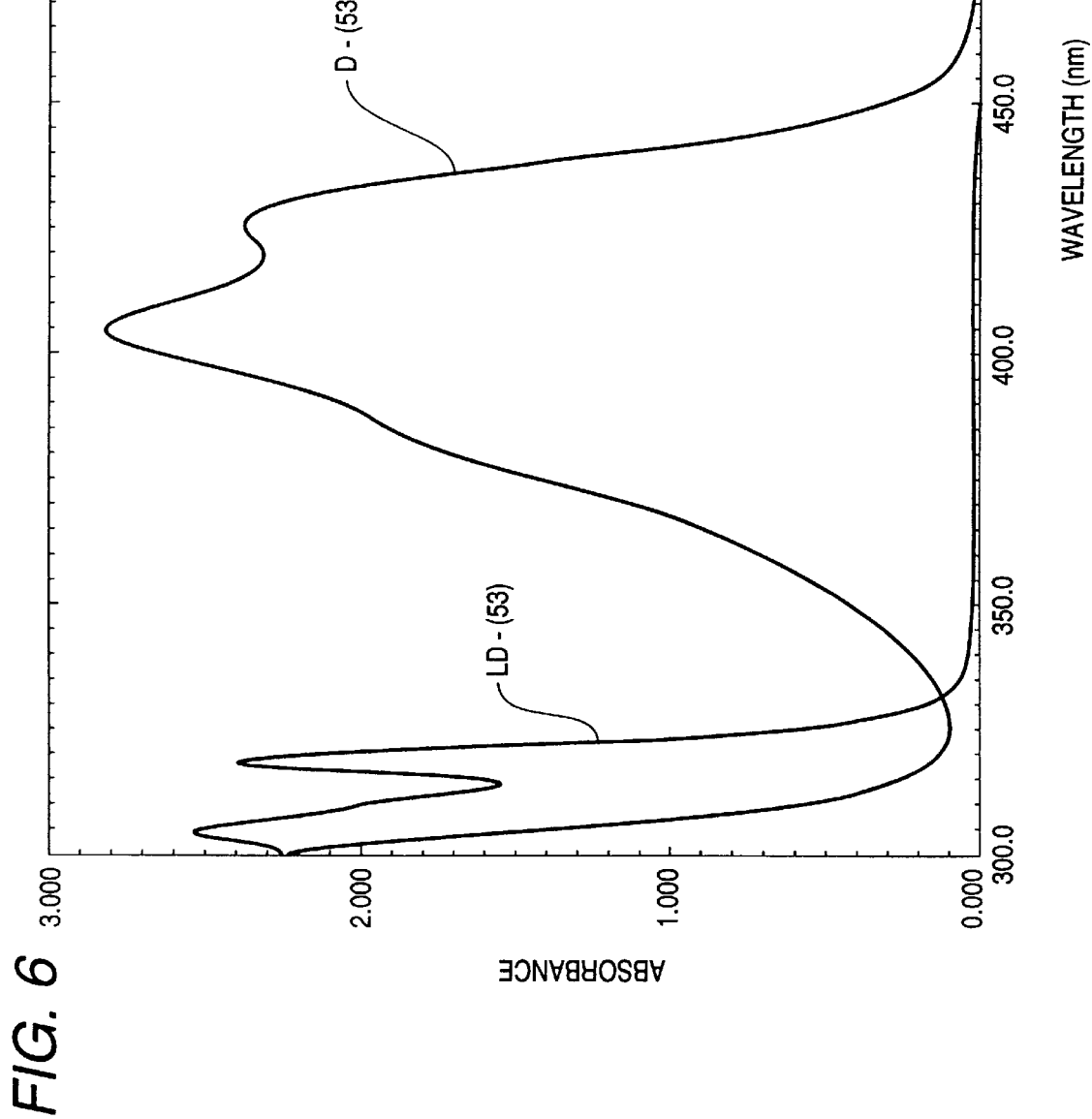
FIG. 6 is a graph showing absorption chart of the color former of leuco dye LD-(53) (in ethyl acetate).
Figure 7:
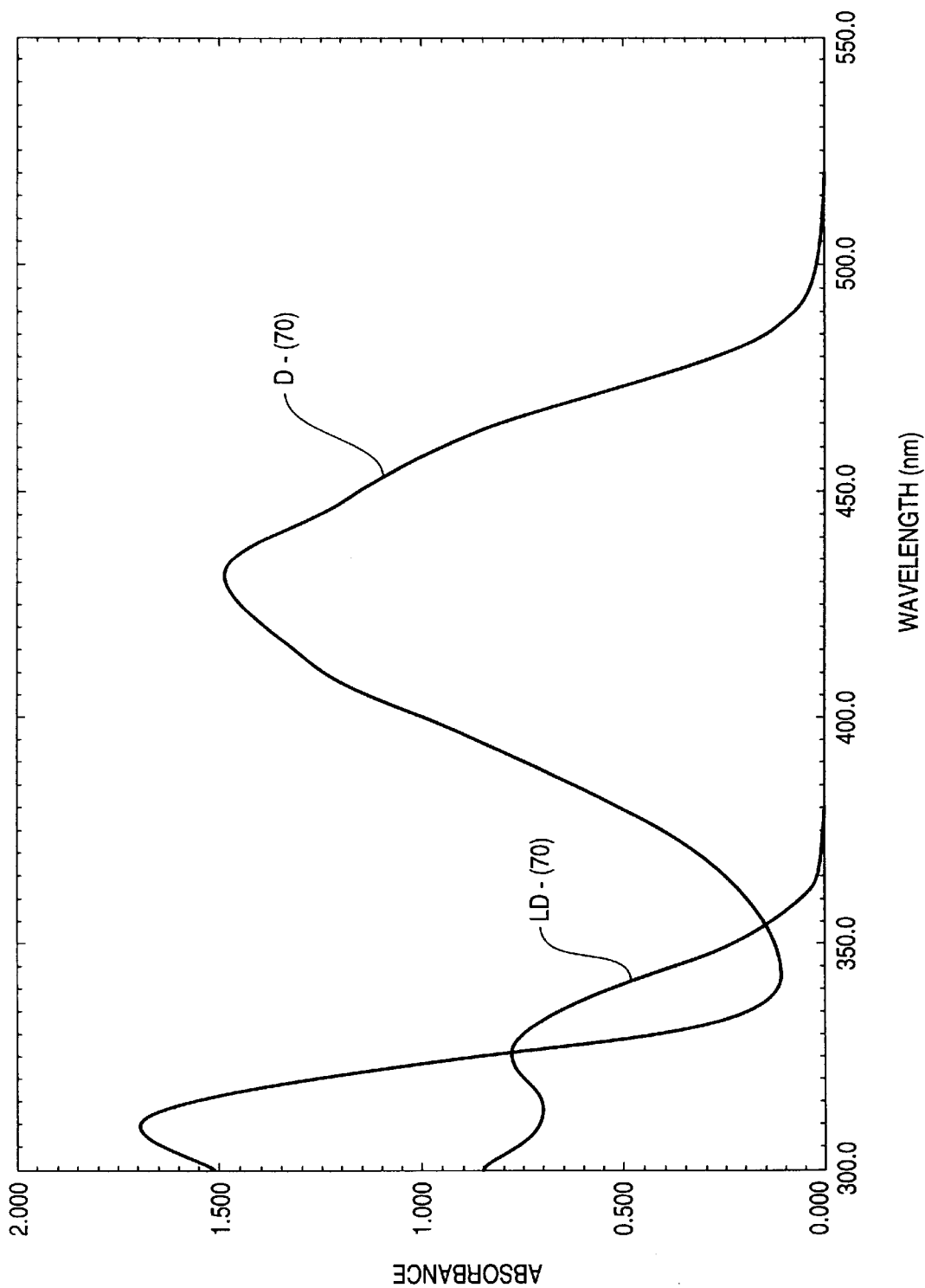
FIG. 7 is a graph showing absorption chart of the color former of leuco dye LD-(70) (in ethyl acetate).

| Absorption chart | Leuco dye | Color Former |
|---|---|---|
| FIG. 6 | LD-(53) | D-(53) |
| FIG. 7 | LD-(70) | D-(70) |

Inventive Example 1

The following compounds were dissolved in chloroform, and the solution was coated on a polyethylene terephthalate film having a thickness of 100 μm and then dried to prepare a transparent image recording sheet. As the polystyrene, polystyrene beads (diameter; about 3.2 mm) manufactured by Wako Pure Chemical Industries were used.

| Sample-1 | |
|---|---|
| Illustrative compound LD-(1) | 1 mmol/m² |
| IR dye | 181 mg/m² |
| Polystyrene | 2.2 g/m² |
| Sample-2 | |
| Illustrative compound LD-(2) | 1 mmol/m² |
| IR dye | 181 mg/m² |
| Polystyrene | 2.2 g/m² |
| Sample-3 | |
| Illustrative compound LD-(3) | 1 mmol/m² |
| IR dye | 181 mg/m² |
| Polystyrene | 2.2 g/m² |
| Sample-4 | |
| Illustrative compound LD-(10) | 1 mmol/m² |
| IR dye | 181 mg/m² |
| Polystyrene | 2.2 g/m² |
| Sample-5 | |
| Illustrative compound LD-(22) | 1 mmol/m² |
| IR dye | 181 mg/m² |
| Polystyrene | 2.2 g/m² |
| Sample-6 | |
| Illustrative compound LD-(24) | 1 mmol/m² |
| IR dye | 181 mg/m² |
| Polystyrene | 2.2 g/m² |
| Sample-7 | |
| Illustrative compound LD-(1) | 1 mmol/m² |
| Illustrative compound A-(91) | 2 mmol/m² |

| | |
|---|---|
| -continued | |
| IR dye | 181 mg/m² |
| Polystyrene | 2.2 g/m² |
| Sample-8 | |
| Illustrative compound LD-(2) | 1 mmol/m² |
| Illustrative compound A-(91) | 2 mmol/m² |
| IR dye | 181 mg/m² |
| Polystyrene | 2.2 g/m² |
| Sample-9 | |
| Illustrative compound LD-(24) | 1 mmol/m² |
| Illustrative compound A-(91) | 2 mmol/m² |
| IR dye | 181 mg/m² |
| Polystyrene | 2.2 g/m² |
| Sample-10 | |
| Illustrative compound LD-(32) | 1 mmol/m² |
| Illustrative compound A-(91) | 2 mmol/m² |
| IR dye | 181 mg/m² |
| Polystyrene | 2.2 g/m² |
| Sample-11 | |
| Illustrative compound LD-(70) | 1 mmol/m² |
| Illustrative compound A-(98) | 2 mmol/m² |
| IR dye | 181 mg/m² |
| Polystyrene | 2.2 g/m² |
| Sample-12 | |
| Illustrative compound LD-(53) | 1 mmol/m² |
| IR dye | 181 mg/m² |
| Reference sample-1 | |
| Comparative compound | 1 mmol/m² |
| IR dye | 181 mg/m² |
| Polystyrene | 2.2 g/m² |

Comparative compound

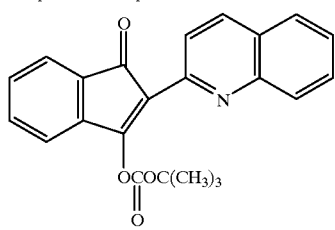

Compound described in Example 1 of U.S. Pat. No. 5,243,052 IR dye

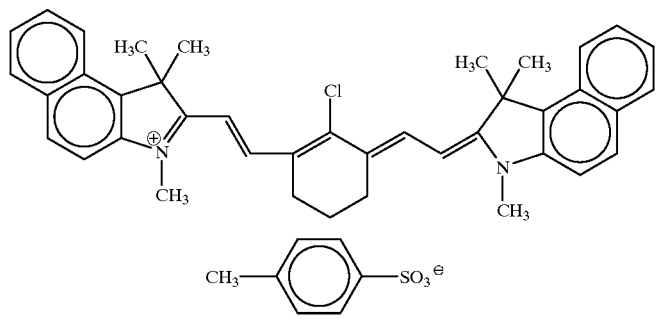

<Laser exposure conditions for image recording>

A total of 8 beams of Spectra Diode Labs No. SDL-2430 (wave length range: 800–830 nm) were combined to adjust the output to 400 mW and used as an image writing laser.

Each of the aforementioned samples was exposed to the thus prepared laser to form an image of 22 mm×9 mm, by setting the beam diameter to 160 μm, the laser scanning speed to 0.5 m/sec (scanning center), the sample feed speed to 15 mm/sec and the scanning pitch to 8/mm. The laser energy density on the sample was 5 mJ/mm² in this case. Also, the energy density was changed as shown in Table B, by changing the laser scanning speed and laser output.

After carrying out scanning exposure on each of the samples 1 to 12 and reference sample 1 under the aforementioned conditions, coloring density at 420 nm on the exposed part was examined, and coloring (color forming) ratio was calculated based on its comparison with the coloring density when the color of each leuco dye was completely developed. Also, each of the samples after laser exposure at an energy density of 2 mJ/mm² was subjected to heat developing under a heating condition of 100° C. for 60 seconds, and the resulting coloring ratio was calculated. The thus obtained results are shown in Table B.

TABLE B

| | Coloring ratio (%) | | | |
|---|---|---|---|---|
| Laser energy density | 5 mJ/mm² | 3 mJ/mm² | 2 mJ/mm² | |
| Heat developing | no | no | no | 100° C., 60 sec |
| Sample 1 (Inventive) | 87.5 | 54.6 | 38.4 | 42.0 |
| Sample 2 (Inventive) | 73.2 | 42.1 | 29.4 | 31.2 |
| Sample 3 (Inventive) | 75.2 | 45.3 | 32.1 | 32.5 |
| Sample 4 (Inventive) | 92.4 | 68.7 | 48.5 | 48.7 |
| Sample 5 (Inventive) | 78.3 | 52.8 | 40.1 | 40.3 |
| Sample 6 (Inventive) | 76.0 | 53.0 | 42.3 | 45.0 |
| Sample 7 (Inventive) | 90.6 | 65.3 | 45.3 | 100 |
| Sample 8 (Inventive) | 78.7 | 53.2 | 38.5 | 95.2 |
| Sample 9 (Inventive) | 89.3 | 65.4 | 50.0 | 100 |
| Sample 10 (Inventive) | 83.6 | 63.2 | 48.5 | 100 |
| Sample 11 (Inventive) | 91.2 | 70.1 | 65.1 | 100 |
| Sample 12 (Inventive) | 93.5 | 72.5 | 68.3 | 100 |
| Reference sample-1 | 68.2 | 32.4 | 8.3 | 9.4 |

As is evident from Table B, the samples 1 to 6 coated with leuco dyes of the present invention have increased sensitivity in comparison with the reference sample 1 coated with a known leuco dye.

Also, it can be seen that the samples 7 to 12 where an acid generator coexisted have further increased sensitivity, and the samples 7, 8 and 9 have increased sensitivity in comparison with their corresponding samples (1, 2 and 6) and their coloring densities are further increased by carrying out heat developing after the laser exposure. In this connection, it was confirmed that the unexposed parts of all of these samples did not develop color under said heat developing conditions.

It can be seen also that the sample 12 coated with a copolymer comprising a leuco dye moiety and an acid generator moiety has further increased sensitivity.

Thus, as has been described in the foregoing, the use of the leuco dye of the present invention renders possible production of an image recording medium which has high sensitivity, can effect image recording with such a low degree of output laser that ablation does not occur even in the case of the use of a laser-aided heat mode image recording system (image recording corresponding to 360 to 420 nm, particularly essential as mask films for plate making use) and does not require separate image receiving sheet.

What is claimed is:

1. A leuco dye in which a hydrogen atom capable of transferring by isomerization in a dye represented by formula (1) or a tautomer thereof is substituted by a substituent group P which can be removed by the action of heat or acid

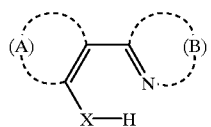

(1)

wherein (A) represents an atomic group necessary for forming a nitrogen-containing hetero ring; (B) represents an atomic group necessary for forming a six-membered hetero ring; and X represents an oxygen atom, a sulfur atom or a nitrogen atom, which may have a hydrogen atom or a possible substituent group.

2. The leuco dye according to claim 1, which is represented by formula (2)

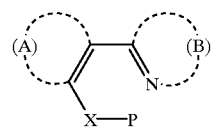

(2)

wherein (A), (B) and X in formula (2) are as defined in formula (1), and P represents a substituent group which can be removed by the action of heat or acid.

3. The leuco dye according to claim 2, which is represented by formula (3)

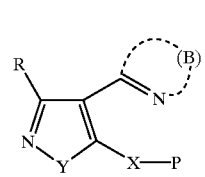

(3)

wherein R represents a hydrogen atom or a substitutable group, Y represents an oxygen atom, a sulfur atom or a nitrogen atom, which may have a hydrogen atom or a possible substituent group, and (B), X and P are as defined in the formula (2), with the proviso that, when X and Y are both nitrogen atoms, substituent groups on the nitrogen atoms may form a ring through their mutual bonding.

4. The leuco dye according to claim 1, wherein X in the formula (1) is an oxygen atom.

5. The leuco dye according to claim 1, wherein the leuco dye represented by the formula (1) has a polymerizable group at a substitutable position and forms a copolymer with a monomer having a partial structure which generates acid by the action of light, heat or acid.

6. An image recording medium which comprises the leuco dye according to claim 1.

7. The image recording medium according to claim 6, which further comprises a compound which generates acid by the action of light or heat.

8. The image recording medium according to claim 6, which further comprises an infrared absorbing substance.

* * * * *